US012320904B2

(12) United States Patent
Wang et al.

(10) Patent No.: US 12,320,904 B2
(45) Date of Patent: Jun. 3, 2025

(54) PRECISE POSITIONING ENGINE

(71) Applicant: QUALCOMM Incorporated, San Diego, CA (US)

(72) Inventors: Min Wang, Tustin, CA (US); David Tuck, San Juan Capistrano, CA (US); Yuxiang Peng, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/062,547

(22) Filed: Dec. 6, 2022

(65) Prior Publication Data
US 2024/0183995 A1 Jun. 6, 2024

(51) Int. Cl.
| | |
|---|---|
| *H04L 1/00* | (2006.01) |
| *G01C 21/12* | (2006.01) |
| *G01S 13/86* | (2006.01) |
| *G01S 19/03* | (2010.01) |
| *G01S 19/25* | (2010.01) |

(52) U.S. Cl.
CPC ............. *G01S 19/25* (2013.01); *G01C 21/12* (2013.01); *G01S 13/867* (2013.01); *G01S 19/03* (2013.01)

(58) Field of Classification Search
CPC ......... H04W 4/40; G06V 20/13; G06T 17/05; G06T 17/10; G06T 2207/30244; G06Q 10/06313; G06F 18/26; G01W 1/02; G01S 19/25
See application file for complete search history.

(56) References Cited

U.S. PATENT DOCUMENTS

| | | | |
|---|---|---|---|
| 2019/0102840 A1* | 4/2019 | Perl | G06N 3/08 |
| 2021/0255336 A1 | 8/2021 | Noble et al. | |
| 2022/0111867 A1* | 4/2022 | Trask | B60W 40/09 |
| 2022/0357464 A1 | 11/2022 | Peng et al. | |

OTHER PUBLICATIONS

International Search Report and Written Opinion—PCT/US2023/033743—ISA/EPO—Jan. 26, 2024.

\* cited by examiner

*Primary Examiner* — Phuoc H Doan
(74) *Attorney, Agent, or Firm* — Thien T. Nguyen

(57) ABSTRACT

Aspects presented herein may improve the positioning accuracy and latency of a positioning engine that receives at least one position constraint for assisting the positioning. A wireless device obtains an indication of at least one position constraint for a positioning engine. The wireless device detects whether the at least one position constraint exceeds an error threshold based on a set of PR residuals between the wireless device and at least one satellite. The wireless device excludes the at least one position constraint from a calculation at the positioning engine if the at least one position constraint exceeds the error threshold, or includes the at least one position constraint in the calculation at the positioning engine if the at least one position constraint is below the error threshold.

30 Claims, 15 Drawing Sheets

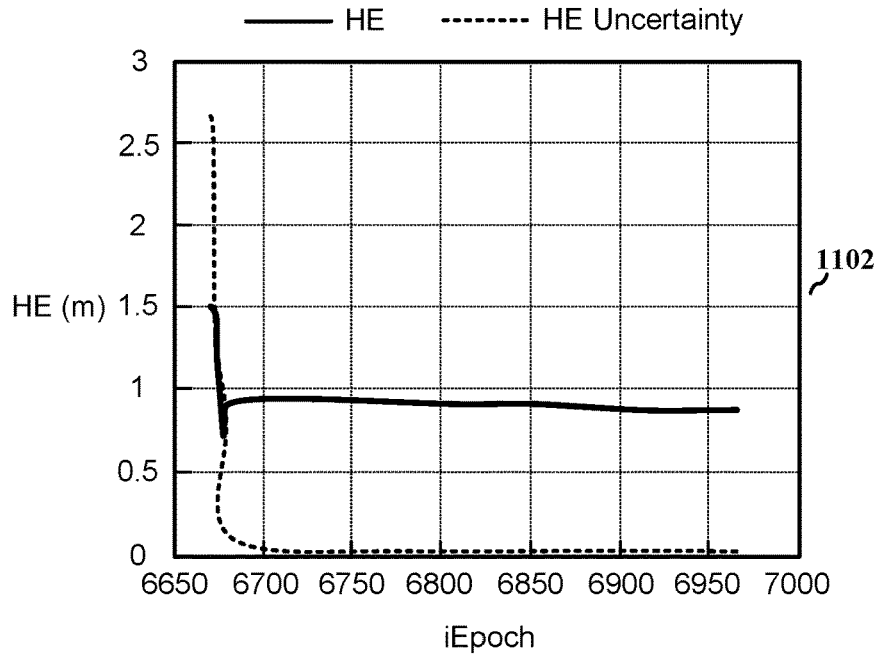
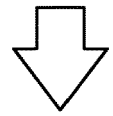
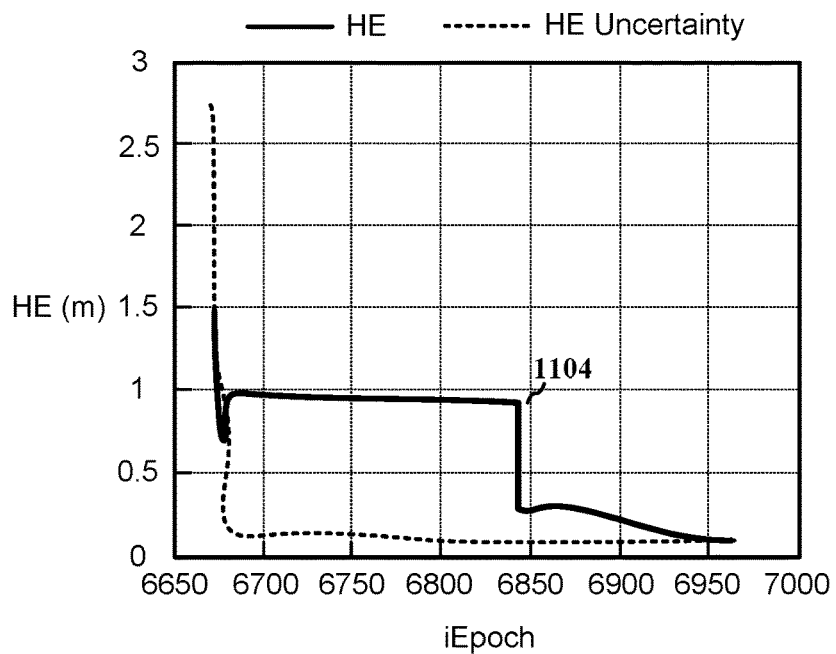
FIG. 11

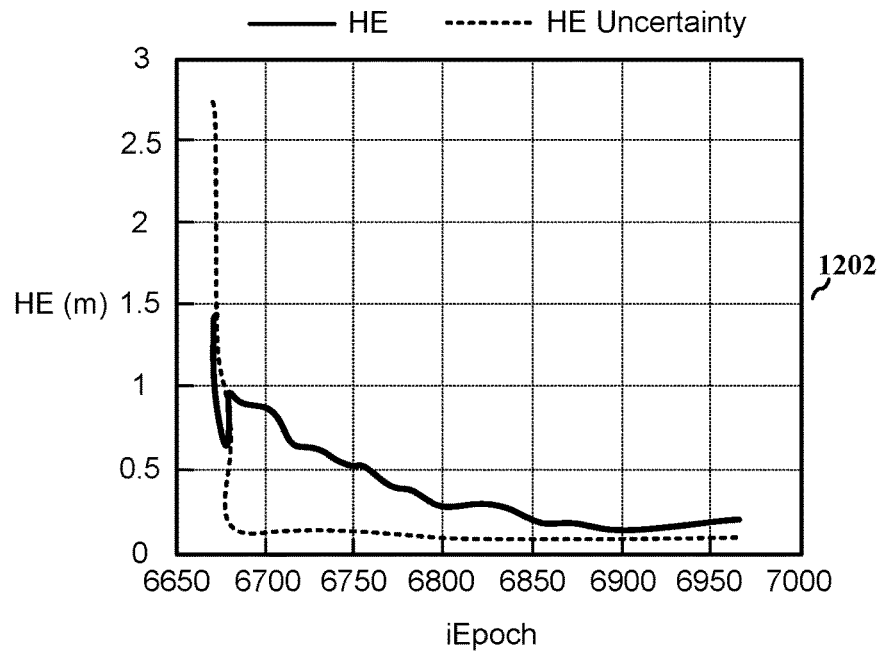
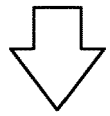
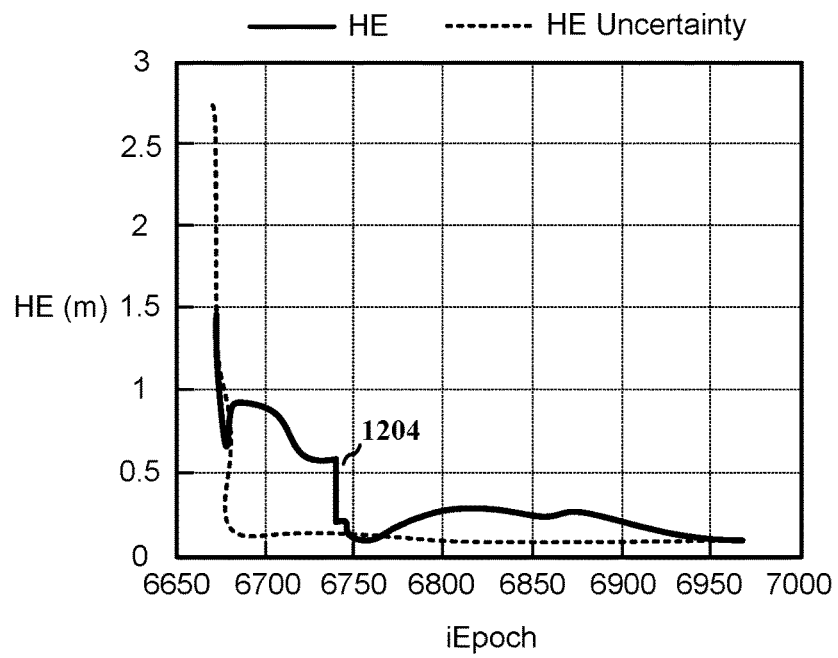
FIG. 12

PRECISE POSITIONING ENGINE

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains an indication of at least one position constraint for a positioning engine. The apparatus detects whether the at least one position constraint exceeds an error threshold based on a set of pseudo-range (PR) residuals between the wireless device and at least one satellite. The apparatus excludes the at least one position constraint from a calculation at the positioning engine if the at least one position constraint exceeds the error threshold, or includes the at least one position constraint in the calculation at the positioning engine if the at least one position constraint is below the error threshold.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a diagram illustrating an example horizontal error and convergence time of a positioning engine that detects an error in a position constraint and reverts back to a precise positioning engine (PPE) solution without the position constraint in accordance with various aspects of the present disclosure.

FIG. 12 is a diagram illustrating an example horizontal error and convergence time of a positioning engine that detects an error in a position constraint and reverts back to a PPE solution without the position constraint in accordance with various aspects of the present disclosure.

DETAILED DESCRIPTION

Figure 1:
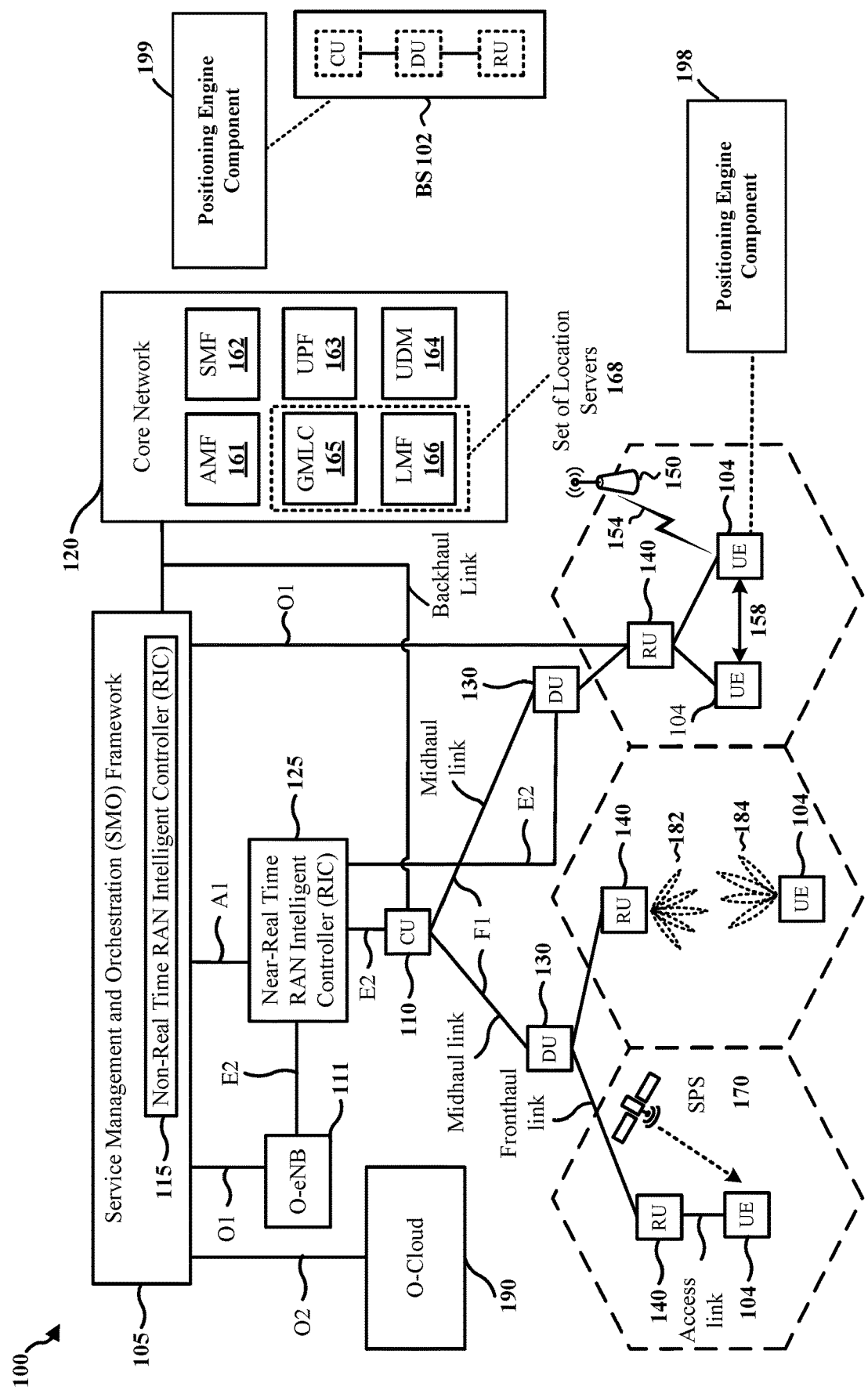
FIG. 1 is a diagram illustrating an example of a wireless communications system and an access network.

Aspects presented herein may improve the positioning accuracy and latency of a positioning engine that receives at least one position constraint for assisting the positioning. Aspects presented herein provide a positioning engine (e.g., a robust precise positioning engine (PPE)) that has the capability to detect a position constraint is associated with a large error that exceeds a high error threshold (e.g., tens or hundreds of meters, etc.) and/or a marginal detectable error that is below a lower error threshold (e.g., below the high error threshold, such as several meters or sub-meters). The positioning engine presented herein may further include the capability to recover to a regular positioning engine performance (e.g., to a regular PPE performance without using a position constraint) if it detects that the position constraint is associated with an error (e.g., the large error and/or the marginal detectable constraint error, etc.). For example, in one aspect of the present disclosure, a positioning engine (e.g., a PPE) may detect a position constraint includes a large error (e.g., tens or hundreds of meters) based on the pseudorange (PR) residuals calculated using the position constraint input. In general, the PR residuals may be very large when the position constraint is associated with a large error. However, this PR residual check mechanism may not be suitable for detecting a position constraint error that is just several meters or sub-meters (e.g., the marginal detectable constraint error). As such, in another aspect of the present disclosure, the positioning engine may further be configured to detect the marginal detectable constraint error based on delta positions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5

(114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may be configured to obtain an indication of at least one position constraint for a positioning engine; detect whether the at least one position constraint exceeds an error threshold based on a set of PR residuals between the wireless device and at least one satellite; and exclude the at least one position constraint from a calculation at the positioning engine if the at least one position constraint exceeds the error threshold, or include the at least one position constraint in the calculation at the positioning engine if the at least one position constraint is below the error threshold (e.g., via the positioning engine component 198/199).

Figure 2:
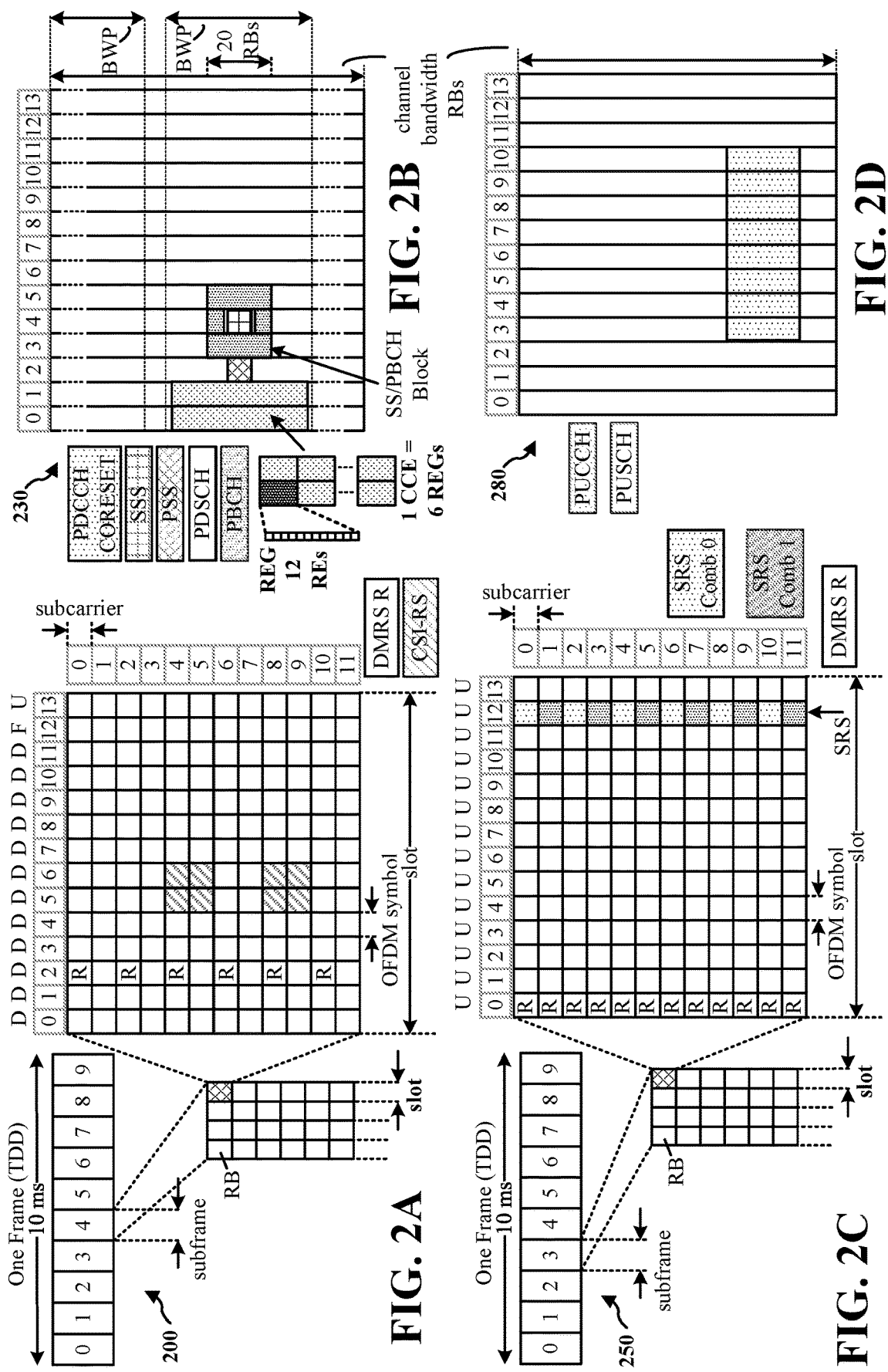
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies u 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
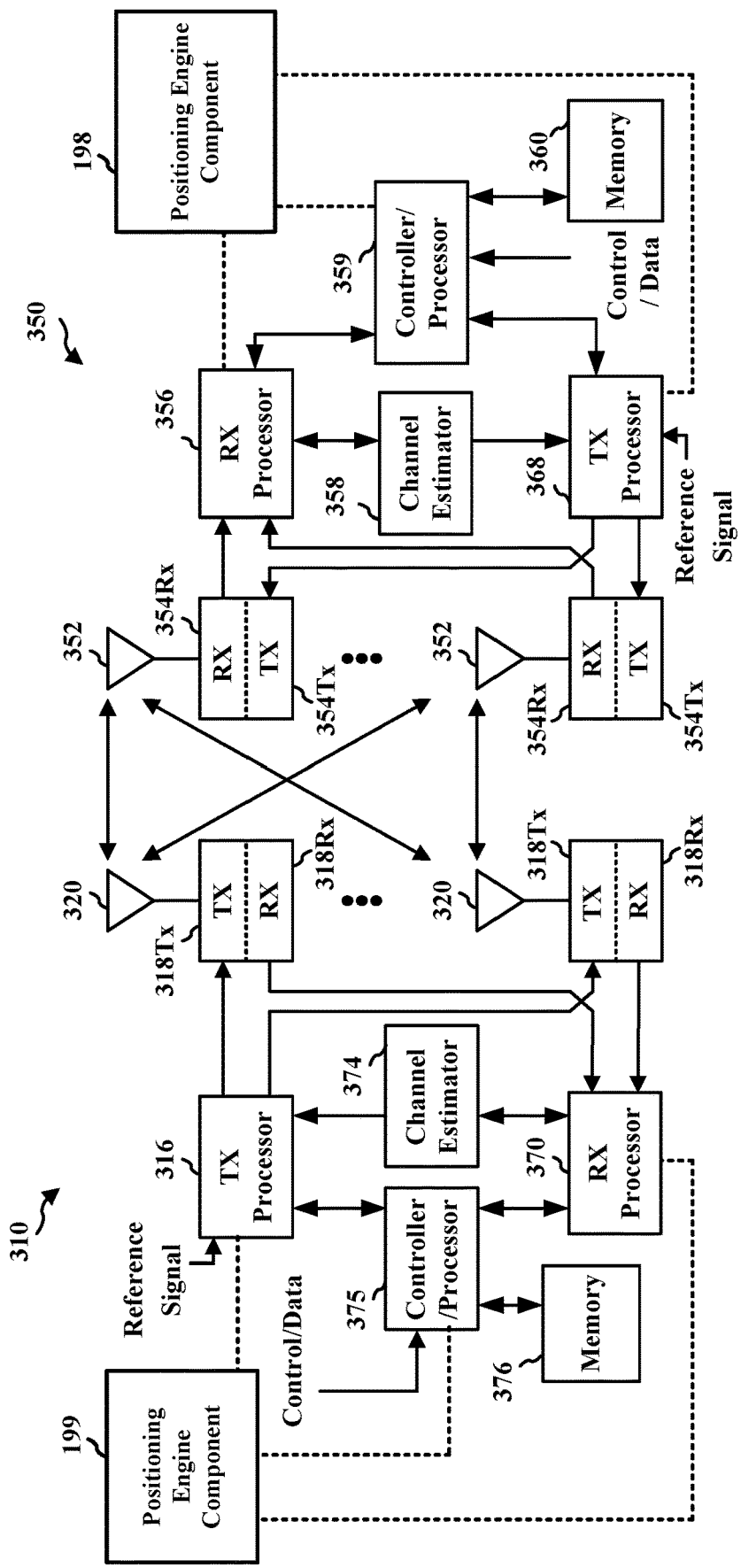
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning engine component 198 of FIG. 1.

At least one of the TX processor 316, the RX processor 370, and the controller/processor 375 may be configured to perform aspects in connection with the positioning engine component 199 of FIG. 1.

Figure 4:
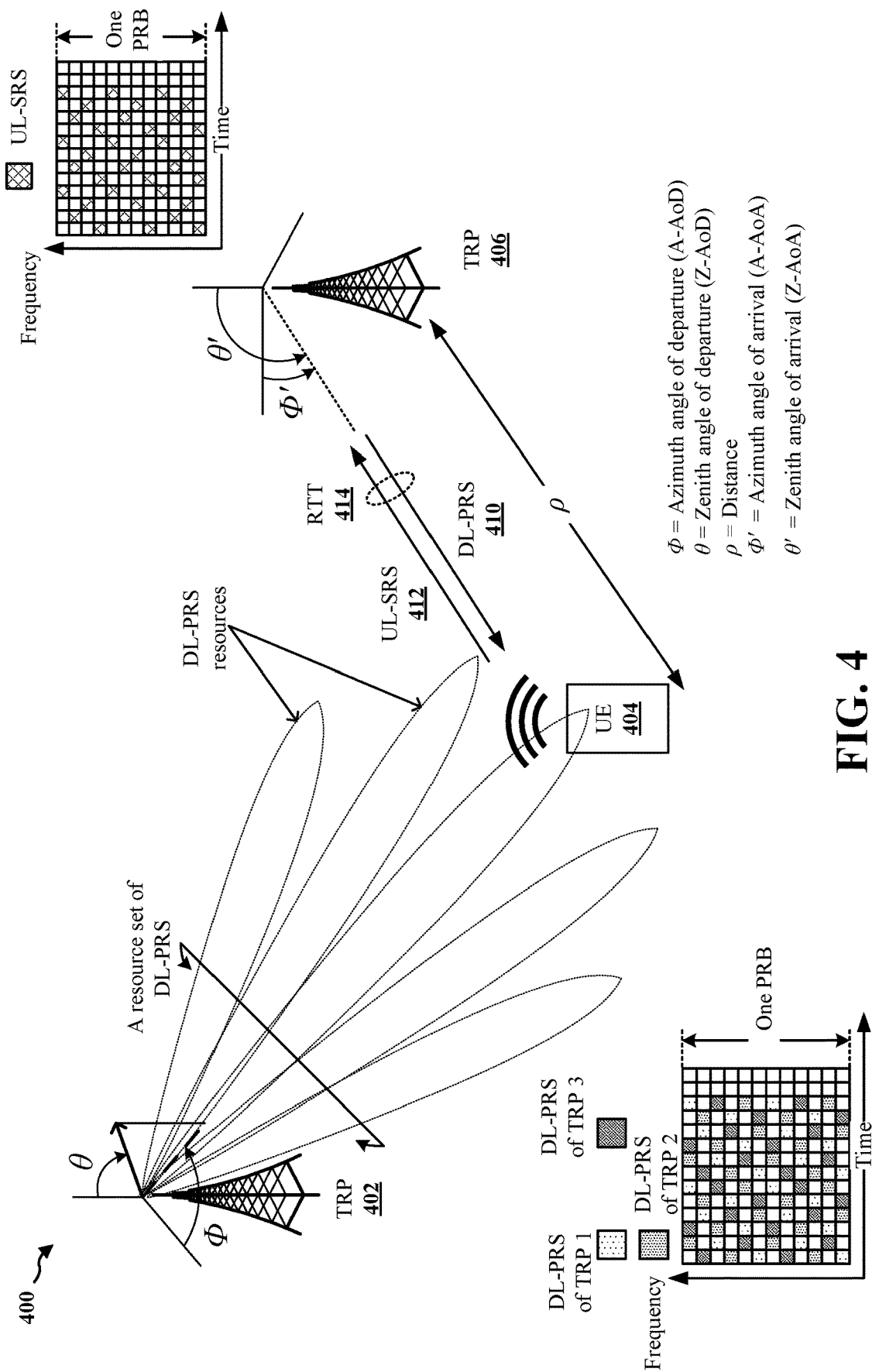
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}\| - \|T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, and/or to determine to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A device (e.g., a UE) equipped with a global navigation satellite system (GNSS) receiver (which may include the Global Positioning System (GPS) receiver) may determine its location based on GNSS positioning. GNSS is a network of satellites broadcasting timing and orbital information used for navigation and positioning measurements. GNSS may include multiple groups of satellites, known as constellations, that broadcast signals (which may be referred to as GNSS signals) to control stations and users of the GNSS. Based on the broadcast signals, the users may be able to determine their locations (e.g., via trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
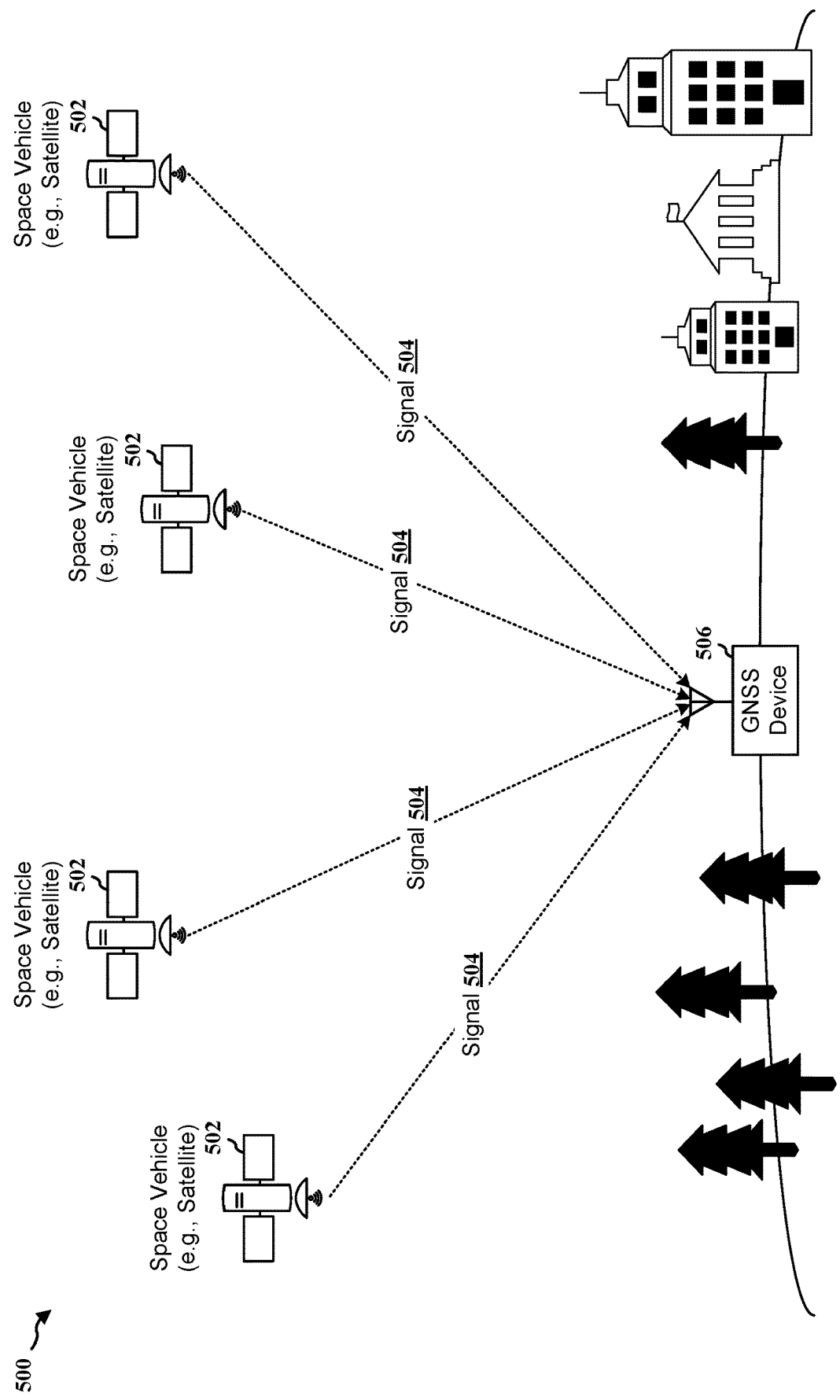
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned.

The accuracy of GNSS based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments. To improve the accuracy of GNSS positioning (e.g., from meters to centimeters), a real time kinematics (RTK) technique or mechanism (which may collectively be referred to as an RTK engine hereafter) may be used for a positioning device (e.g., a UE, a surveying equipment, an automobile GNSS system, etc.). For example, an RTK engine may enable a positioning device to use correction information from a base station to mitigate one or more error sources in GNSS receiver pseudo-range (PR) and carrier-phase (CP) measurements, which may include satellite orbit error, satellite clock error, and/or atmospheric error, etc. Thus, better accuracy may be achieved by the positioning device.

Figure 6:
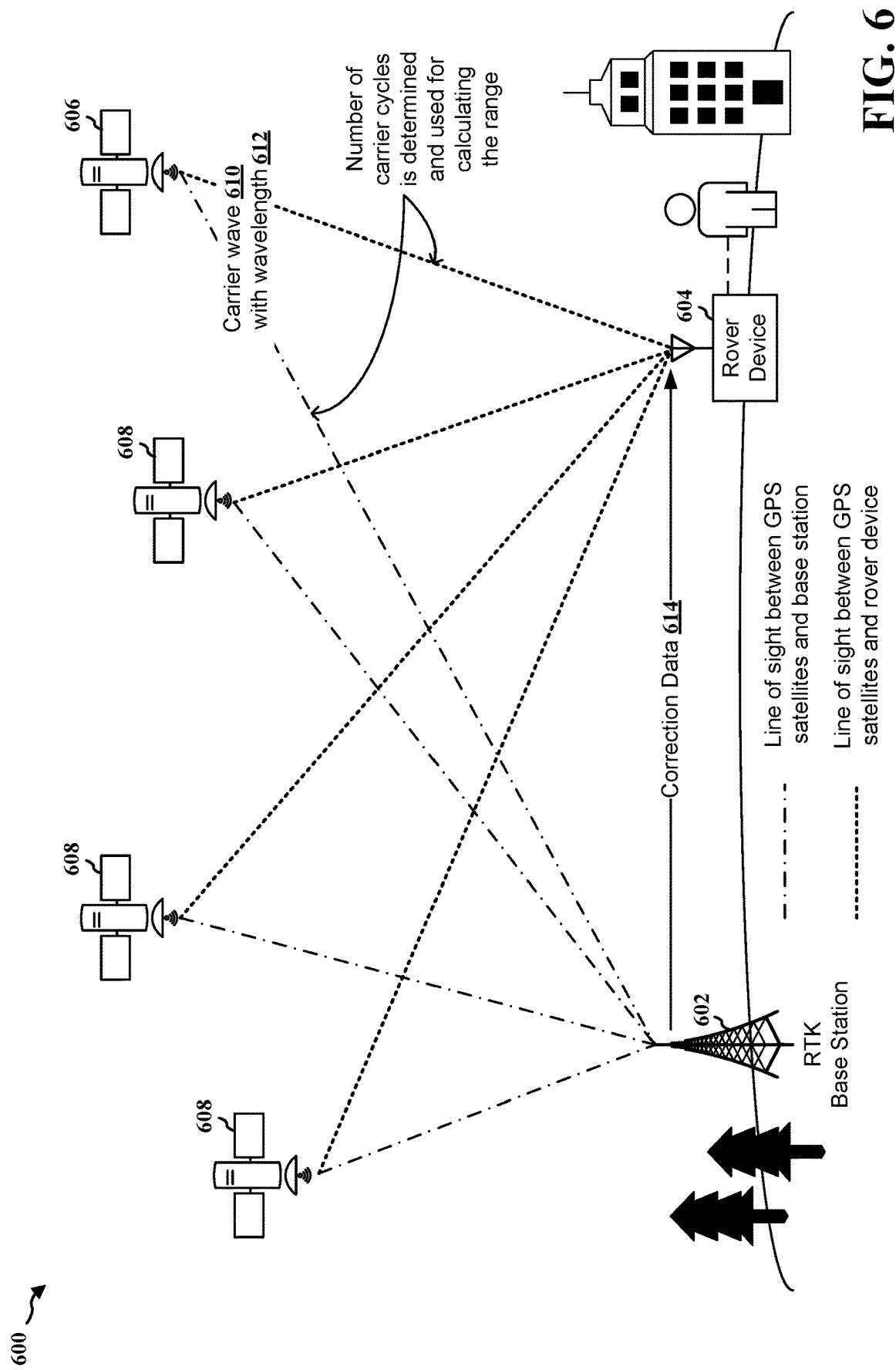
FIG. 6 is a diagram illustrating an example of a real time kinematics (RTK) positioning in accordance with various aspects of the present disclosure.

FIG. 6 is a diagram 600 illustrating an example of an RTK positioning in accordance with various aspects of the present disclosure. In one example, at least two receivers may be used in association with the RTK positioning, where at least one of the receivers may be stationary, which may be referred to as a base station 602 or an RTK base station, and at least one other receiver may be mobile (e.g., may be moving from time to time), which may be referred to as a rover or a rover device 604 (e.g., a GNSS/GPS receiver, a UE, a rover station, etc.). In other words, an RTK system may include at least a base station and a rover, where the base station may be a stationary receiver whose location is known.

A range between an SV 606 (e.g., a GNSS/GPS satellite) and the rover device 604 or between the SV 606 and the base station 602 may be calculated by determining a number of carrier cycles between the SV 606 and the rover device 604 or the base station 602, and multiplying this number by the carrier wavelength 612 of a carrier wave 610 (e.g., a carrier signal) transmitted by the SV 606. For example, if the SV 606 is transmitting a carrier wave 610 with a wavelength 612 of ten (10) meters, and the rover device 604 receives the carrier wave 610 and determines that there are five hundred (500) carrier cycles between the SV 606 and the rover device 604, then the rover device 604 may calculate the distance between the SV 606 and the rover device 604 by multiplying the number of carriers cycles determined (e.g., 500) with the carrier wavelength 612 (e.g., 10 meters), which may be five thousand meters (e.g., 500×10=5000). Similarly, the base station 602 may also receive the carrier wave 610 from the SV 606 and determine its ranges from the SV 606 based on the wavelength 612 of the carrier wave 610 and the number of carrier cycles between the base station 602 and the SV 606. The rover device 604 and/or the base station 602 may calculate ranges (e.g., distances) between the rover device 604/base station 602 and multiple (e.g., four or more) SVs (e.g., SVs 606 and 608) to determine their geographical locations (e.g., their locations on the Earth).

During the RTK positioning, the rover device 604 (e.g., a UE, a client device, etc.) may undergo an "ambiguity resolution" process to determine the number of carrier cycles between the SV 606 and the rover device 604. In other words, when the rover device 604 receives a carrier wave from an SV 606, it may take time for the rover device 604 to figure out how many carrier cycles are between the SV 606 and the rover device 604. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity." In some examples, the process of a GNSS receiver resolving the ambiguity may be referring to as converging, and the time it takes a device to resolve the ambiguity may be referred to as a convergence time.

In some scenarios, ranges calculated by the rover device 604 may include errors due to SV clock and ephemerides, and ionospheric and tropospheric delays, etc. Also, as the rover device 604 is more likely to be moving, the quality of a signal/carrier wave received from each SV may change as the rover device moves from one location to another location. For example, if the rover device 604 moves from an open sky area to an area with buildings, signals from one or more SVs 606/608 may be blocked/reflected by the buildings. As such, ranges calculated by the rover device 604 may start to drift and may include error(s).

On the other hand, as the base station 602 is likely to be stationary with a known location, and the base station 602 may be equipped with a more sophisticated and high-end GNSS receiver, the base station 602 may be able to maintain an accurate calculation for the ranges compared to the rover device 604. For example, the base station 602 may be located at a site (e.g., an open sky area) that has minimal environmental effects such as interference and multipath. As such, under the RTK positioning, as the base station 602 may have known its location already (e.g., via pre-surveying), the base station 602 may perform a measurement for an SV to obtain a base receiver measurement (e.g., to estimate a difference between the base station and the SV). Then, the base station 602 may minus the geometry distance between the base station location to SV location from the base receiver measurement to obtain a base correction (e.g., based on a difference or an error). The base station 602 may generate a correction data 614 (or a correction signal) based on the obtained base correction and transmit the correction data 614 to the rover device 604 to assist the rover device 604 in correcting the errors. For example, as the rover device 604 may typically be configured to locate in proximity to the base station 602 (e.g., within 6 miles, 12 miles, etc.), the rover device 604 is likely to encounter similar errors as the base station 602 (e.g., similar ionospheric and tropospheric delays, etc.). Thus, the rover device 604 may use the correction data 614 from the base station 602 to improve and expedite its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 604 may determine its position using algorithms that incorporate ambiguity resolution and differential correction. The position accuracy achievable by the rover device 604 may depend on its distance from the base station 602 and the accuracy of the differential corrections (e.g., the correction data 614).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing RTK (e.g., receiving or processing correction data associated with RTK) may be considered as a PPE. Another example of PPE is a positioning engine that is capable of performing precise point positioning (PPP). PPP is a positioning technique that removes or models GNSS system errors to provide a high level of position accuracy from a single receiver. A PPP solution may depend on GNSS satellite clock and orbit corrections, generated from a network of global reference station. Once the corrections are calculated, they are delivered to the end user via satellite or over the Internet. These corrections are used by the receiver, which may result in decimeter-level or better positioning with no base station involved.

In one aspect of the present disclosure, to further improve the accuracy and latency of positioning, a positioning engine (e.g., PPE, PPP, and/or RTK, etc.) may also be configured to receive at least one external position constraint. For purposes of the present disclosure, a position constraint may refer to information associated with a positioning-related measurement, a positioning-related uncertainty, and/or an output from another device, entity, or component that may be used for assisting the positioning performed by a positioning device, to achieve better positioning accuracy and reduce the convergence time. For example, a position constraint source may be a dead-reckoning (DR) output from a fusion engine, an image/vision output from a camera or an image capturing device, a pre-surveyed landmark with known position, a user manual input, an odometer output, a map-matching output, an ultra-wideband (UWB) positioning output, a terrestrial positioning output, a Wi-Fi positioning output, a network-based positioning output, or a combination thereof.

One purpose of configuring a positioning engine to receive at least one position constraint from an external source is to reduce the convergence time at the positioning engine (e.g., to enable the positioning engine to resolve the ambiguity faster). For example, as described in connection with FIG. 6, a GNSS receiver with a less sophisticated antenna/hardware may take a relatively longer time to converge compared to a GNSS with a sophisticated antenna/hardware. Thus, by enabling a positioning engine associated with a GNSS receiver with a less sophisticated antenna/hardware to receive at least one position constraint (e.g., information related to position and/or position uncertainty, etc.) from another device, entity, or component, the convergence time of the positioning engine may be reduced. For example, a positioning device entering into an indoor structure (e.g., a tunnel, a building, etc.) may not be able to receive GNSS signals and perform positioning based on GNSS. After the positioning device exits the indoor structure and is able to receive the GNSS signals again, it may take certain time for the positioning device to converge. However, if a position constraint source is available, it may be used by the positioning device to assist reducing the long convergence time.

While a position constraint may be used for assisting a positioning engine, the accuracy and the convergence time of the positioning engine may be reduced or worsened if the position constraint information is inaccurate or wrong. For example, the position uncertainty associated with the position constraint may be over optimistic. In some scenarios, the positioning engine may be tied to a confidently wrong position constraint information (e.g., output) for a very long time, which may cause the positioning engine to perform/provide inaccurate positioning for a period of time. In other scenarios, the convergence time for a positioning engine may become even longer with the incorrect position constraint information.

Figure 7A:
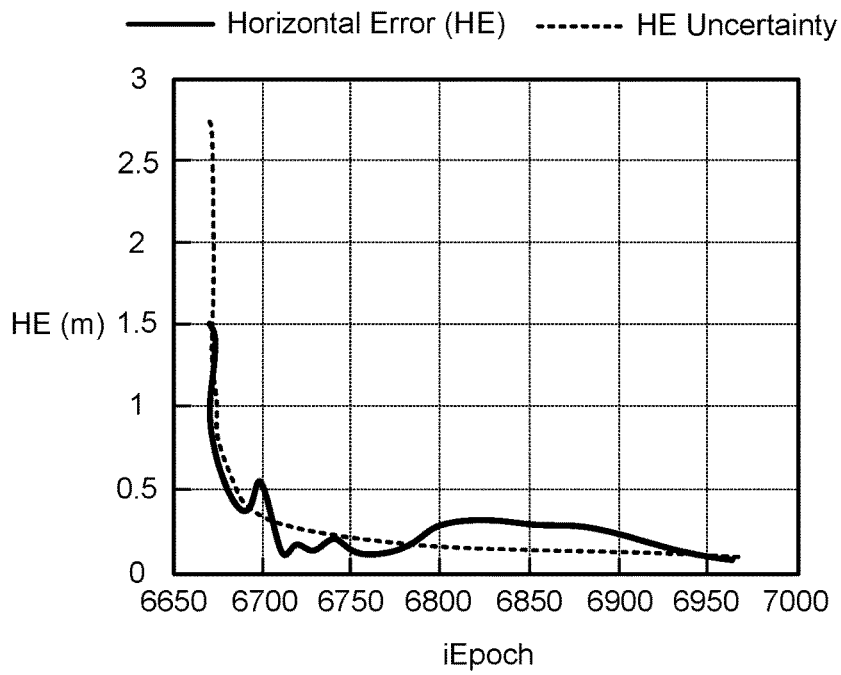
FIG. 7A is a diagram illustrating an example horizontal error and convergence time of a positioning engine without receiving a position constraint in accordance with various aspects of the present disclosure.
Figure 7B:
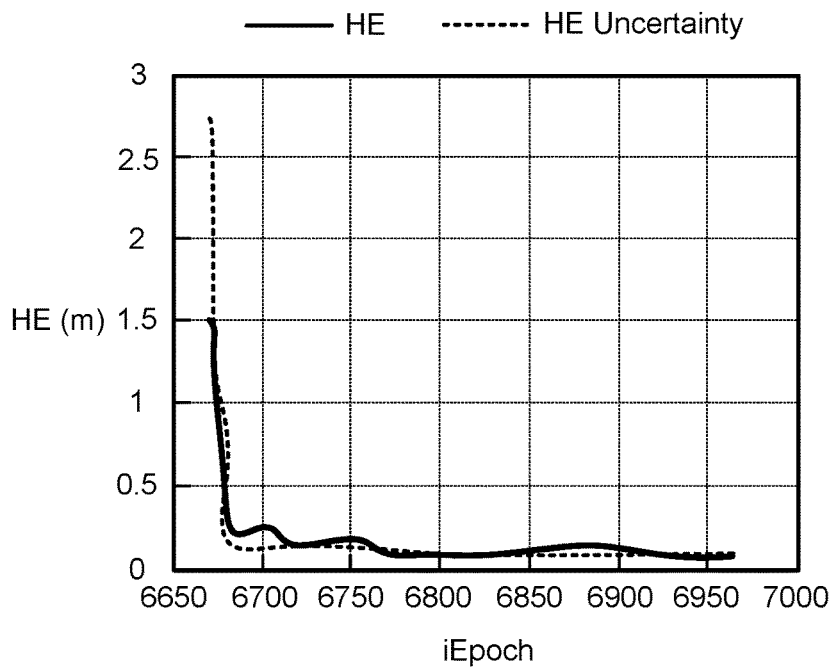
FIG. 7B is a diagram illustrating an example horizontal error and convergence time of a positioning engine that receives a position constraint in accordance with various aspects of the present disclosure.

FIG. 7A is a diagram 700A illustrating an example horizontal error and convergence time of a positioning engine without receiving a position constraint in accordance with various aspects of the present disclosure. As shown by the diagram 700A, after a positioning engine starts to receive GNSS signals, it may take some time for the positioning engine to converge, such as to keep the horizontal error (HE) associated with the positioning below certain error threshold (e.g., 0.3 meter, 0.2 meter, etc.). FIG. 7B is a diagram 700B illustrating an example horizontal error and convergence time of a positioning engine that receives a position constraint in accordance with various aspects of the present disclosure. As shown by the diagram 700B, after a positioning engine starts to receive GNSS signals and with the assistance of at least one position constraint, the time for the positioning engine to converge may be relatively shorter compared to the positioning engine without receiving the position constraint as shown by the diagram 700A.

Figure 8A:
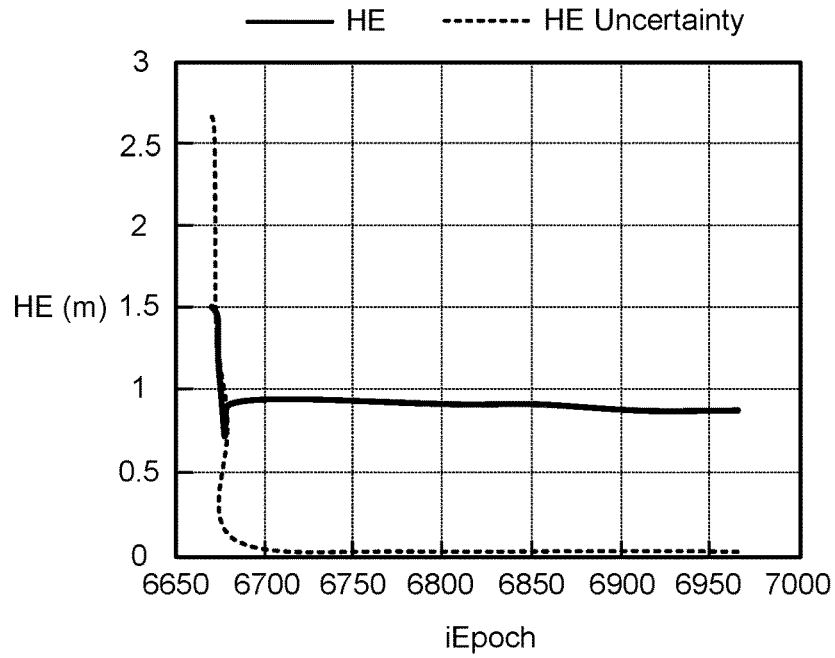
FIG. 8A is a diagram illustrating an example horizontal error and convergence time of a positioning engine that receives a wrong position constraint in accordance with various aspects of the present disclosure.

FIG. 8A is a diagram 800A illustrating an example horizontal error and convergence time of a positioning engine that receives a wrong position constraint in accordance with various aspects of the present disclosure. As shown by the diagram 800A, in a case where a positioning engine receives a wrong or incorrect position constraint for a long time, the positioning engine may not be able to converge for a certain period of time, e.g., the positioning engine may be associated with an error of 70 cm and an uncertainty of 1 cm in each dimension for a long period of time.

Figure 8B:
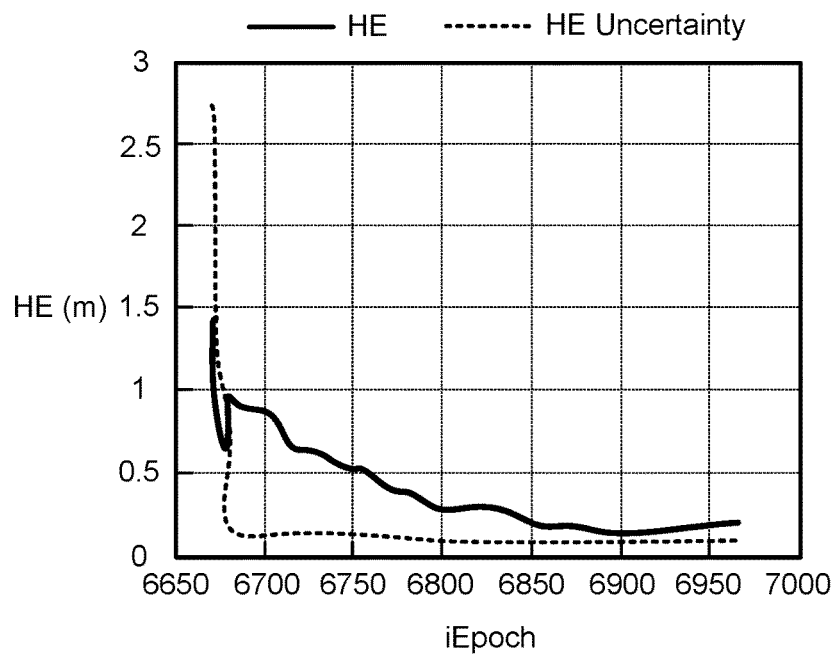
FIG. 8B is a diagram illustrating an example horizontal error and convergence time of a positioning engine that receives a wrong position constraint in accordance with various aspects of the present disclosure.

FIG. 8B is a diagram 800B illustrating an example horizontal error and convergence time of a positioning engine that receives a wrong position constraint in accordance with various aspects of the present disclosure. As shown by the diagram 800B, in another case where a positioning engine receives a wrong or incorrect position constraint, it may take a longer time for the positioning engine to converge compared to the positioning engine without receiving the position constraint as shown by the FIG. 7A.

Aspects presented herein may improve the positioning accuracy and the convergence time of a positioning engine that receives at least one position constraint for assisting the positioning. Aspects presented herein provide a positioning engine (e.g., a robust PPE) that has the capability to detect that a position constraint is associated with an error that exceeds (e.g., greater than and/or equal to) a high error threshold (e.g., tens or hundreds of meters, etc.) and/or is below a lower error threshold (e.g., below the high error threshold, such as lesser than or equal to several meters or sub-meters). For purposes of the present disclosure, an error that exceeds the "high error threshold" may be referred to as a "large error," and an error that does not exceed the high error threshold or is below the low error threshold (or within a lower error threshold range) may be referred to as a "marginal error" or a "marginal detectable constraint error." In some examples, the large error may be detected based on pseudo-range (PR) residuals, and the marginal detectable constraint error may not be detected based on PR residuals. A PR residual may refer to the difference between a calculated range to the satellites and the measured PR (e.g., a PR measurement minus an calculated range). The positioning engine presented herein may further include the capability to recover to a regular positioning engine performance (e.g., to a regular PPE performance without using a position constraint) if it detects that the position constraint is associated with an error (e.g., the large error and/or the marginal detectable constraint error, etc.).

In one aspect of the present disclosure, a positioning engine (e.g., a PPE) may detect a position constraint includes a large error based on the PR residuals calculated using the position constraint input. In general, the PR residuals may be very large when the position constraint is associated with a large error (e.g., tens to hundreds of meters). As such, the PR residual may be used for detecting a large error. However, this PR residual check mechanism may not be suitable for detecting a position constraint error that is just several meters or sub-meters (e.g., the marginal detectable constraint error). As such, in another aspect of the present disclosure, the positioning engine may further be configured to detect the marginal detectable constraint error based on performing cross-checks between PPE solution without constraint and PPE solution with constraint and/or between delta position and PPE solution with constraint.

Figure 9:
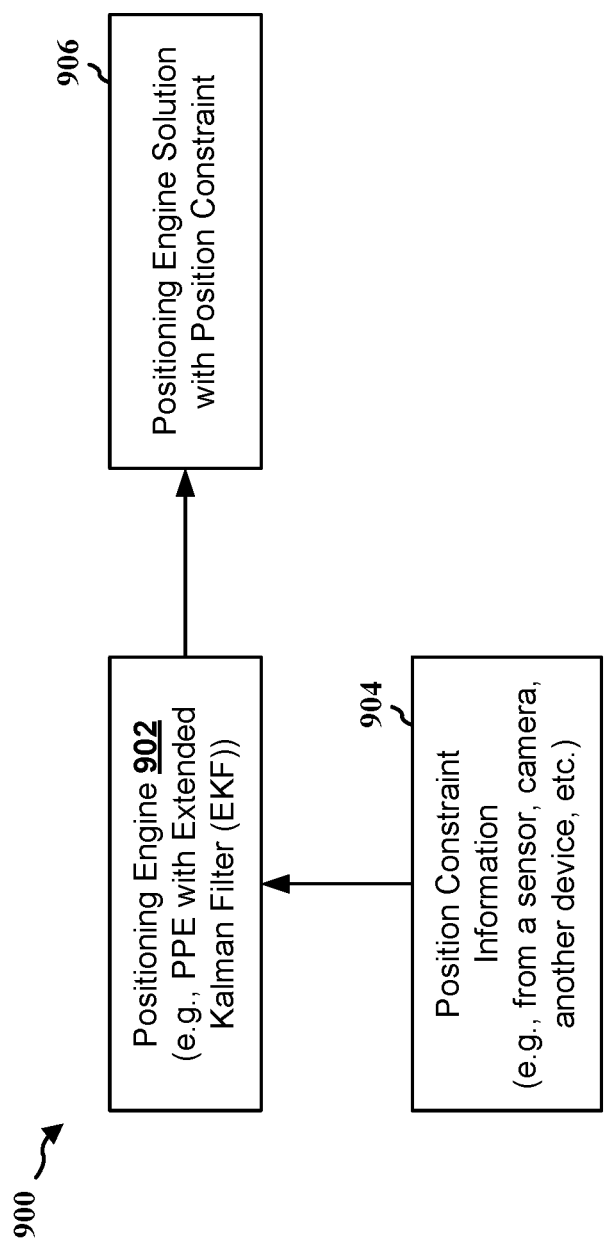
FIG. 9 is a diagram illustrating an example of a positioning engine with position constraint in accordance with various aspects of the present disclosure.

FIG. 9 is a diagram 900 illustrating an example of a positioning engine (e.g., a regular PPE) with position constraint in accordance with various aspects of the present disclosure. As shown at 904, a positioning engine 902 (e.g., a PPE with extended Kalman Filter (EKF)) may receive position constraint information from another device, component, or entity, such as from an IMU sensor, a camera, or another device). As shown at 906, based on the received position constraint information, the positioning engine may generate a solution (e.g., a PPE solution) with the position constraint. For purposes of the present disclosure, a solution, such as a PPE solution, may refer to a set of parameters associated with a Kalman Filter (KF) or a KF state. For example, a set of parameters associated with a KF or KF state may include position, velocity, receiver clock, receiver clock rate, inter-satellite-type bias (ISTB), and/or ambiguity terms, etc.

Figure 10:
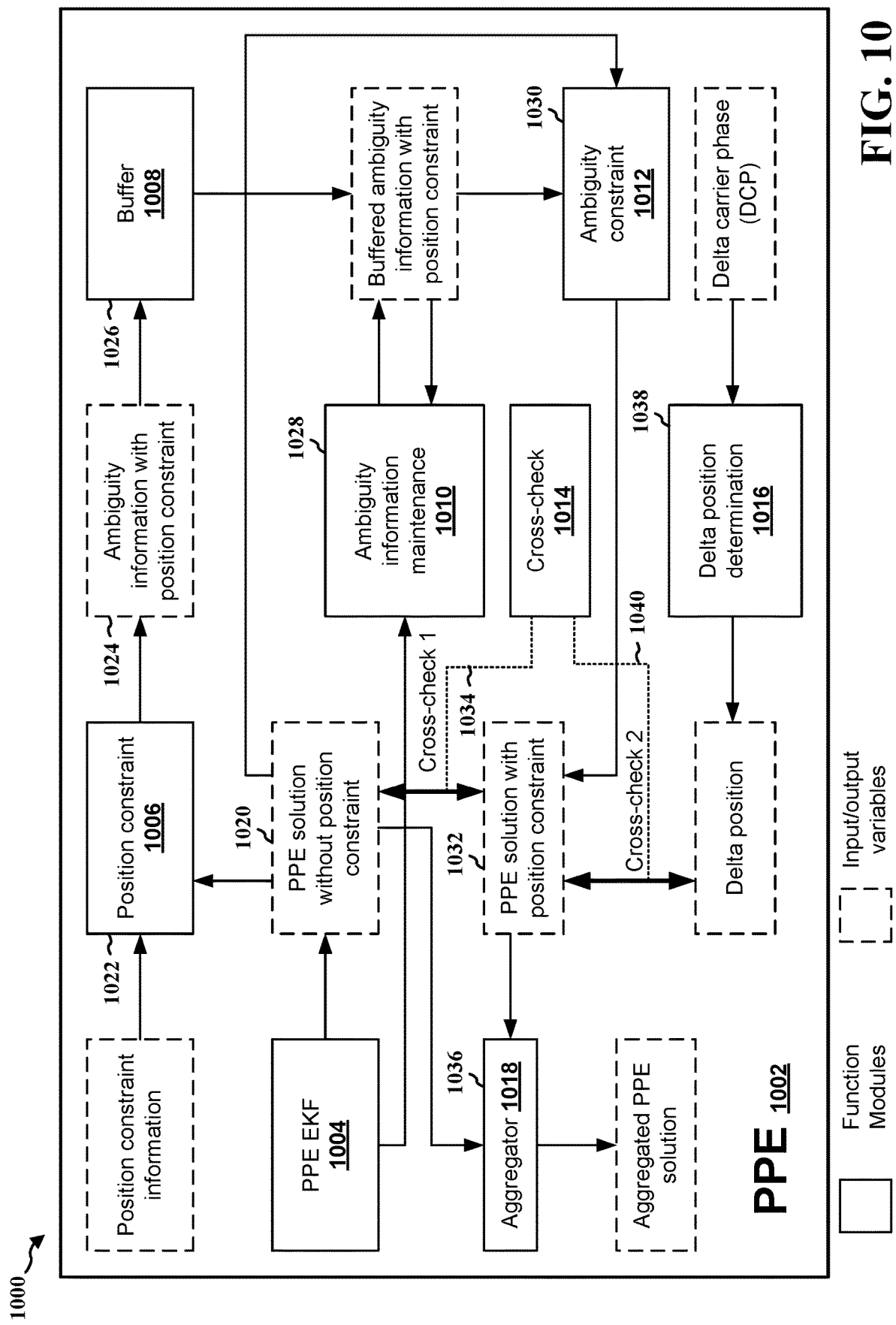
FIG. 10 is a diagram illustrating an example of a positioning engine with the capability to detect errors associated with a position constraint in accordance with various aspects of the present disclosure.

FIG. 10 is a diagram 1000 illustrating an example of a positioning engine with the capability to detect errors, such as the marginal detectable constraint errors, associated with a position constraint in accordance with various aspects of the present disclosure. Aspects presented herein provides a positioning engine (e.g., a robust PPE) that is capable of detecting a position constraint error (e.g., a large error, a marginal error, an error that exceeds an error threshold, and/or an error that is unable to be detected based on the PR residual check mechanism, etc.) and recovering from the position constraint error. While the diagram 1000 illustrates aspects of the present disclosure with a PPE, it is merely for illustration purposes. Aspects presented herein may also apply to other types of positioning engines, such as a PPP engine, an RTK engine, or a regular (non-PPE) positioning engine, etc. The positioning engine may be operated/run on various wireless devices or GNSS-based positioning device/server, such as on a UE, a base station, a network node, a network entity, a location server, or an Internet of Things (IOT) device, etc.

In one aspect, a PPE 1002 (e.g., a positioning engine) may include a plurality of function modules (which may also be referred to as "function logics" or simply "logics"), such as a PPE module 1004, a position constraint module 1006, a buffer module 1008, an ambiguity information maintenance module 1010, an ambiguity constraint module 1012, a cross-check module 1014, a delta position determination module 1016, and/or an aggregator module 1018, etc.

The PPE 1002 may be configured to detect whether a position constraint includes an error (e.g., a large error) based on the PR residuals calculated using the position constraint input. As the PR residuals may be very large when the position constraint is associated with an error that exceeds a large error threshold (e.g., greater than or equal to tens to hundreds of meters), the PPE 1002 may determine that a position constraint includes an error based on calculating PR residuals. If the PPE 1002 determines that the position constraint includes an error based on the calculated PR residuals, the PPE 1002 may exclude the position constraint from a calculation (e.g., a positioning calculation) at the PPE 1002. On the other hand, if the PPE 1002 determines that the position constraint does not include an error, the PPE 1002 may include the position constraint in the calculation at the PPE 1002. However, this PR residual check mechanism may not be suitable for detecting a position constraint error that is just several meters or sub-meters (e.g., the marginal detectable constraint error). As such, the PPE 1002 may further be configured to detect the marginal detectable constraint error based on performing cross-checks between PPE solution without constraint and PPE solution with constraint and/or between delta position and PPE solution with constraint.

For example, as shown at 1020, as the PPE 1002 may perform positioning without a position constraint, the PPE module 1004 may be configured to output a PPE solution that is not associated with a position constraint. This PPE solution without the position constraint may be available or generated all the time.

As shown at 1022, when the PPE 1002 is configured to perform positioning with at least one position constraint, the position constraint module 1006 of the PPE 1002 may receive position constraint information from a component, an entity, or another device (e.g., a sensor, a camera, etc.). In addition, the position constraint module 1006 may also receive the PPE solution without position constraint generated from the PPE module 1004.

As shown at 1024, after receiving the position constraint information and the PPE solution without position constraint, the position constraint module 1006 may combine/convert them and generate an ambiguity information with position constraint (e.g., similar to a data structure). As shown at 1026, this ambiguity information with position constraint may be buffered at the buffer module 1008 (rather than directly change the KF/EKF state(s) in the PPE module 1004).

In some examples, as shown at 1028, the ambiguity information maintenance module 1010 may be used to ensure that the ambiguity information with position constraint is up-to-date, such as by receiving inputs from the PPE module 1004 and comparing them with the buffered ambiguity information with position constraint from the buffer module 1008. For example, the PPE solution from the PPE module 1004 may change over time when the PPE 1002 moves to a different location, when one or more satellites change their locations, or when the PPE 1002 connects to a new satellite, etc. As such, both the PPE solution without position constraint and the ambiguity information with position constraint may be available to the PPE 1002 at all time.

As shown at 1030, the ambiguity constraint module 1012 may receive the PPE solution without position constraint from the PPE module 1004 and the buffered ambiguity information with position constraint from the buffer module 1008, and the ambiguity constraint module 1012 may combine the two information and generate a PPE solution with position constraint, such as shown at 1032.

Thus, as shown at 1020 and 1032, at every epoch (e.g., at a particular time or at a specific point in time), there may be two sets of PPE solutions available at the PPE 1002: a PPE solution without position constraint and a PPE solution with position constraint (e.g., obtained via the ambiguity constraint module 1012). In other words, there may be two sets of parameters for the KF/KF state.

In one aspect of the present disclosure, as shown at 1034, to determine whether the position constraint information is accurate or contains errors (e.g., a marginal error), the cross-check module 1014 of the PPE 1002 may perform a first cross-check (cross-check 1) between the PPE solution without position constraint and the PPE solution with position constraint by comparing their values/calculated distances. In some examples, the first cross-check may be capable of detecting wrong constraint information that is with a marginal constraint position error and with a very small constraint position uncertainty (e.g., 1 cm). Based on the first cross-check or the comparison, if a horizontal error (HE) difference and/or a three-dimensional (3D) distance between the two PPE solutions are above a first error/distance threshold, the cross-check module 1014 may determine that the position constraint information is wrong or inaccurate. On the other hand, if the horizontal error difference and/or the 3D distance between the two PPE solutions are below the first error/distance threshold, the cross-check module 1014 may determine that the position constraint information is accurate or acceptable (but may subject to a second cross-check discussed below).

As shown at 1036, the aggregator module 1018 may be used for aggregating the PPE solution without position constraint and the PPE solution with position constraint, and generate an aggregated PPE solution. If the cross-check module 1014 determines that the position constraint information is wrong or inaccurate (e.g., the horizontal error difference and/or the 3D distance exceeds the distance threshold), the aggregator module 1018 may reject/exclude the PPE solution with position constraint and uses just the PPE solution without position constraint. In other words, the aggregated PPE solution generated by the aggregator module 1018 may just include the PPE solution without position constraint. Such configuration may prevent the PPE 1002 from using wrong position constraint information that affects the accuracy of the positioning, such as illustrated by FIGS. 8A and 8B.

In some scenarios, when the position constraint information is different (or the constraint error type is different), its impact to the PPE 1002 may also be different. As such, in another aspect of the present disclosure, the PPE 1002 may further be configured to perform a second cross-check (cross-check 2) to increase the accuracy of position constrain error detection/identification. For example, the first cross-check may be configured to detect a wrong position constraint information that has a marginal constraint position error with a first (e.g., a very small) constraint position uncertainty (e.g., 1 cm), and the second cross-check may be configured to detect a wrong position constraint information that has a marginal constraint position error with a second (e.g., a larger) constraint position uncertainty (e.g., 10 cm). In another example, the first cross-check may be more suitable for detecting a first type of position constraint error, whereas the second cross-check may be more suitable for detecting a second type of position constraint error.

In one example, as shown at 1038, at the same epoch, the delta position determination module 1016 may be configured to receive delta carrier phase (DCP) and determine a delta position of the PPE 1002 (e.g., the change in position of the PPE 1002). Note the delta position may not be an absolute position of the PPE 1002, but rather a relative position of the PPE 1002 with high accuracy. For example, the relative position may be a position of the PPE 1002 at a second point in time (T1) with respect the position of the PPE 1002 at a first point in time (T0).

Then, as shown at 1040, the cross-check module 1014 may be configured to perform a second cross-check between the delta position and the PPE solution with position constraint to determine whether the position constraint information includes a position constraint error (e.g., a marginal detectable error) by comparing their values/calculated distances. For example, the cross-check module 1014 may compare the horizontal error difference or the 3D distance between the delta position from the delta position determination module 1016 and a delta position derived based on the PPE solution with position constraint (which may be referred to as the "derived delta position" hereafter). If the delta position matches the derived delta position, the cross-check module 1014 may determine that the position constraint information is accurate. On the other hand, if there is a difference between the delta position and the derived delta position, or if the difference between them exceeds a difference threshold (e.g., a second error/distance threshold), the cross-check module 1014 may determine that the position constraint information is wrong or inaccurate.

Similarly, as discussed in connection with 1036, based on the second cross-check result, the aggregator module 1018 may determine whether to use or aggregate PPE solution with position constraint. For example, if the cross-check module 1014 determines that the position constraint information is wrong or inaccurate based on the second cross-check, the aggregator module 1018 may reject/exclude the PPE solution with position constraint and uses just the PPE solution without position constraint. In other words, when either the first cross-check (at 1034) or the second cross-check (at 1040) fails, the aggregator module 1018 may revert back to the PPE solution without position constraint (e.g., the PPE 1002 may perform the positioning without the position constraint). In some scenarios, the aggregator module 1018 may also revert to the PPE solution without position constraint if the PPE solution without position constraint (or the PPE module 1004) is converged.

The cross-check module 1014 may improve the robustness of PPE solution(s) by performing a first cross-checks between different PPE solutions and a second cross-check between the delta position and the derived delta position. As such, aspects presented herein (e.g., the two-steps cross-check) may ensure that the position constraint information is accurate to a certain degree by enabling the PPE 1002 to detect both the big error and the marginal detectable constraint error associated with the position constraint information, thereby improving the accuracy of positioning using at least one position constraint at the PPE 1002.

FIG. 11 is a diagram 1100 illustrating an example horizontal error and convergence time of a positioning engine that detects a marginal detectable constraint error with a first (e.g., a very small) position constraint uncertainty (e.g. 1 cm uncertainty) in a position constraint and reverts back to a PPE solution without the position constraint in accordance with various aspects of the present disclosure. As shown at 1102 (and discussed in connection with FIG. 8A), when a positioning engine (e.g., the PPE 1002) receives a wrong or incorrect position constraint, the positioning engine may not be able to converge for a certain period of time. On the other hand, as shown at 1104, the first cross-check discussed in connection with 1034 of FIG. 10 may enable the positioning engine to detect that the constraint information includes an error (or a first type of error) when cross-checking between the PPE solution without position constraint and the PPE solution with position constraint, and the positioning engine may exclude the PPE solution with position constraint from the positioning.

FIG. 12 is a diagram 1200 illustrating an example horizontal error and convergence time of a positioning engine that detects a marginal detectable constraint error with a second (e.g., a larger) position constraint uncertainty (e.g. 10 cm) in a position constraint and reverts back to a PPE solution without the position constraint in accordance with various aspects of the present disclosure. As shown at 1202 (and discussed in connection with FIG. 8B), when a positioning engine (e.g., the PPE 1002) receives a wrong or incorrect position constraint, it may take a longer time for the positioning engine to converge. On the other hand, as shown at 1204, the second cross-check discussed in connection with 1040 of FIG. 10 may enable the positioning engine to detect that the constraint information includes an error (or a second type of error) when cross-checking between a delta position obtained from measuring delta carrier phase and a delta position derived based on solution with position constraint, and the positioning engine may exclude the solution with position constraint from positioning.

Figure 13:
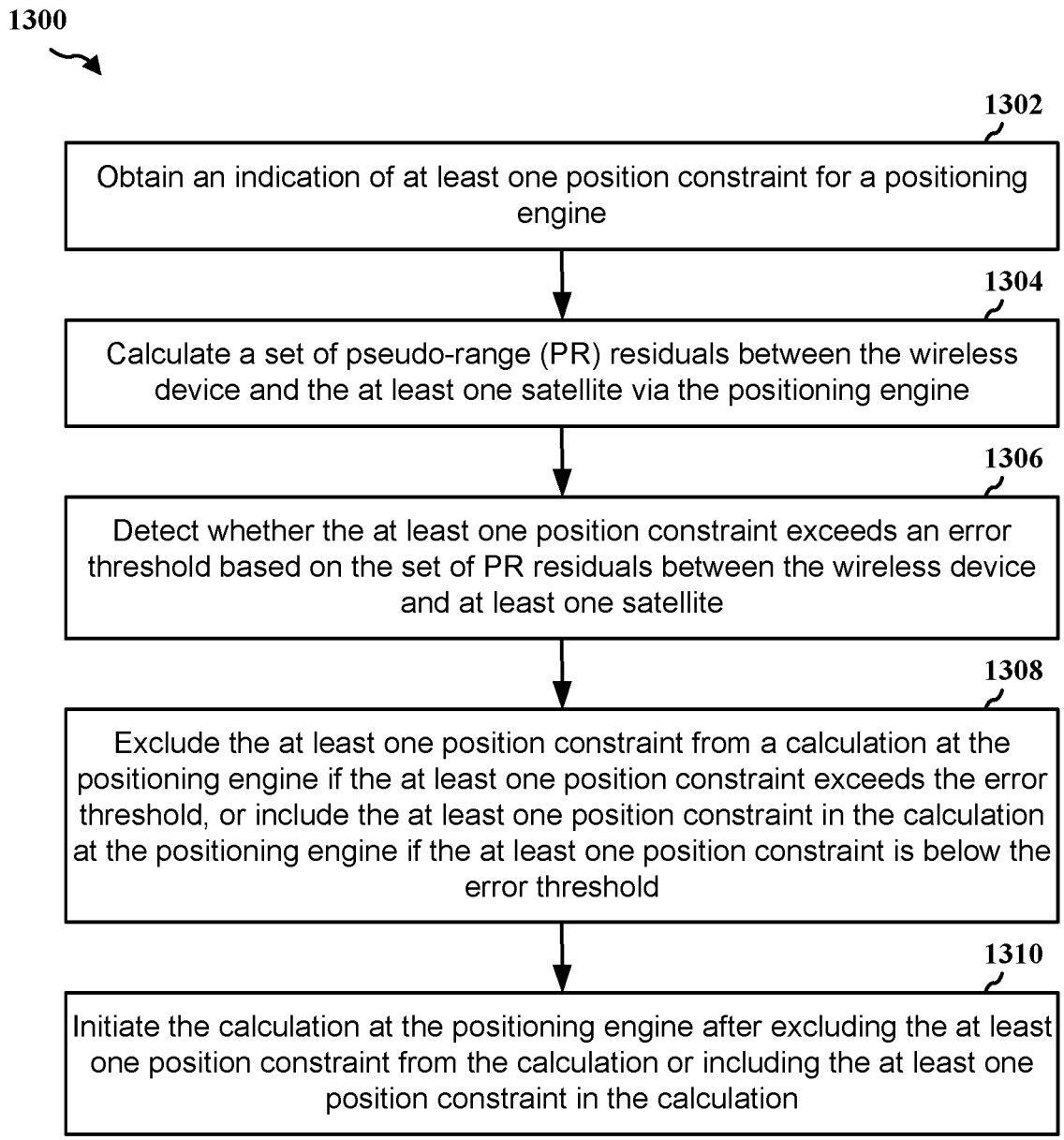
FIG. 13 is a flowchart of a method of wireless communication.

FIG. 13 is a flowchart 1300 of a method of wireless communication. The method may be performed by a wireless device (e.g., the base station 102; the LMF 166; the UE 104, 404; the GNSS device 506; the rover device 604; the PPE 1002; the apparatus 1504). The method may enable the wireless device (e.g., a positioning engine) to detect whether a position constraint is associated with an error and to recover to a regular positioning engine performance if it detects that the position constraint is associated with an error.

At 1302, the wireless device may obtain an indication of at least one position constraint for a positioning engine, such as described in connection with FIG. 10. For example, at 1022, the PPE 1002 may obtain position constraint information via its position constraint module 1006. The means for obtaining the indication of the at least one position constraint may be performed by, e.g., the positioning engine component 198, the cellular baseband processor 1524, and/or the transceiver(s) 1522 of the apparatus 1504 in FIG. 15.

In one example, the at least one position constraint includes at least one of: a dead-reckoning (DR) output from a fusion engine, a camera vision output from at least one camera, a user manual input, an odometer output, a map-matching output, an ultra-wideband (UWB) positioning output, a terrestrial positioning output, a Wi-Fi positioning output, or a network-based positioning output.

In another example, the wireless device is a UE, a base station, a network node, a network entity, a location server, the positioning engine, or an IoT device.

In another example, the positioning engine is a PPP engine or an RTK engine.

In another example, the indication of the at least one position constraint for the positioning engine is obtained after a GNSS outage.

In another example, to obtain the indication of the at least one position constraint, the wireless device may receive the indication of the at least one position constraint from the positioning engine.

At 1304, the wireless device may calculate a set of PR residuals between the wireless device and the at least one satellite via the positioning engine, such as described in connection with FIG. 10. For example, the PPE 1002 may calculate a set of PR residuals using a position constraint. The means for calculating the set of PR residuals may be performed by, e.g., the positioning engine component 198, the cellular baseband processor 1524, and/or the transceiver(s) 1522 of the apparatus 1504 in FIG. 15.

In one example, the set of PR residuals includes at least one of: a receiver clock error, a position constraint error, or an atmospheric error.

At 1306, the wireless device may detect whether the at least one position constraint exceeds an error threshold based on the set of PR residuals between the wireless device and at least one satellite, such as described in connection with FIG. 10. For example, as the PR residuals may be very large when the position constraint is associated with a large error, the PPE 1002 may detect whether the at least one position constraint is associated with an error (e.g., a large error) based on the PR residuals. The means for detecting whether the at least one position constraint exceeds an error threshold may be performed by, e.g., the positioning engine component 198, the cellular baseband processor 1524, and/or the transceiver(s) 1522 of the apparatus 1504 in FIG. 15.

In one example, the error threshold is a maximum error threshold (e.g., the large error threshold).

At 1308, the wireless device may exclude the at least one position constraint from a calculation at the positioning engine if the at least one position constraint exceeds the error threshold, or include the at least one position constraint in the calculation at the positioning engine if the at least one position constraint is below the error threshold, such as described in connection with FIG. 10. For example, if the PPE 1002 determines that the position constraint includes an error based on the calculated PR residuals, the PPE 1002 may exclude the position constraint from a calculation (e.g., a positioning calculation) at the PPE 1002. On the other hand, as shown at 1036, the aggregator module 1018 of the PPE 1002 may include the position constraint in the calculation if the position constraint does not exceed the error threshold. The means for excluding or including the at least one position constraint may be performed by, e.g., the positioning engine component 198, the cellular baseband processor 1524, and/or the transceiver(s) 1522 of the apparatus 1504 in FIG. 15.

In one example, to include the at least one position constraint in the calculation at the positioning engine, the wireless device may recover the at least one position constraint if the at least one position constraint is below the error threshold. In such an example, the wireless device may calculate a difference between a first position of the wireless device that is calculated based on the positioning engine without the at least one position constraint and a second position of the wireless device that is calculated based on the positioning engine with the at least one position constraint, and the wireless device may exclude the at least one position constraint from the calculation at the positioning engine in response to the difference exceeding a difference threshold, or include the at least one position constraint in the calculation at the positioning engine in response to the difference not exceeding the difference threshold. In such an example, the first position of the wireless device and the second position of the wireless device are calculated for a same epoch. In another example, to recover the at least one position constraint if the at least one position constraint is below the error threshold, the wireless device may exclude the at least one position constraint from the calculation at the positioning engine if the positioning engine is converged without the at least one position constraint.

In another example, to include the at least one position constraint in the calculation at the positioning engine if the at least one position constraint is below the error threshold, the wireless device may compute a first delta position of the wireless device using a DCP, the wireless device may calculate a difference between a first position of the wireless device that is calculated based on the first delta position with a second position of the wireless device that is calculated based on a second delta position derived from the at least one position constraint, and the wireless device may exclude the at least one position constraint from the calculation at the positioning engine in response to the difference exceeding a difference threshold, or include the at least one position constraint in the calculation at the positioning engine in response to the difference not exceeding the difference threshold. In such an example, the first position of the wireless device and the second position of the wireless device are calculated for a same epoch.

At 1310, the wireless device may initiate the calculation at the positioning engine after excluding the at least one position constraint from the calculation or include the at least one position constraint in the calculation, such as described in connection with FIG. 10. For example, at 1036, the aggregator module 1018 of the PPE 1002 may generate an aggregated PPE solution, and the PPE 1002 may perform positioning based on this aggregated PPE solution. The means for initiating the calculation at the positioning engine may be performed by, e.g., the positioning engine component 198, the cellular baseband processor 1524, and/or the transceiver(s) 1522 of the apparatus 1504 in FIG. 15.

Figure 14:
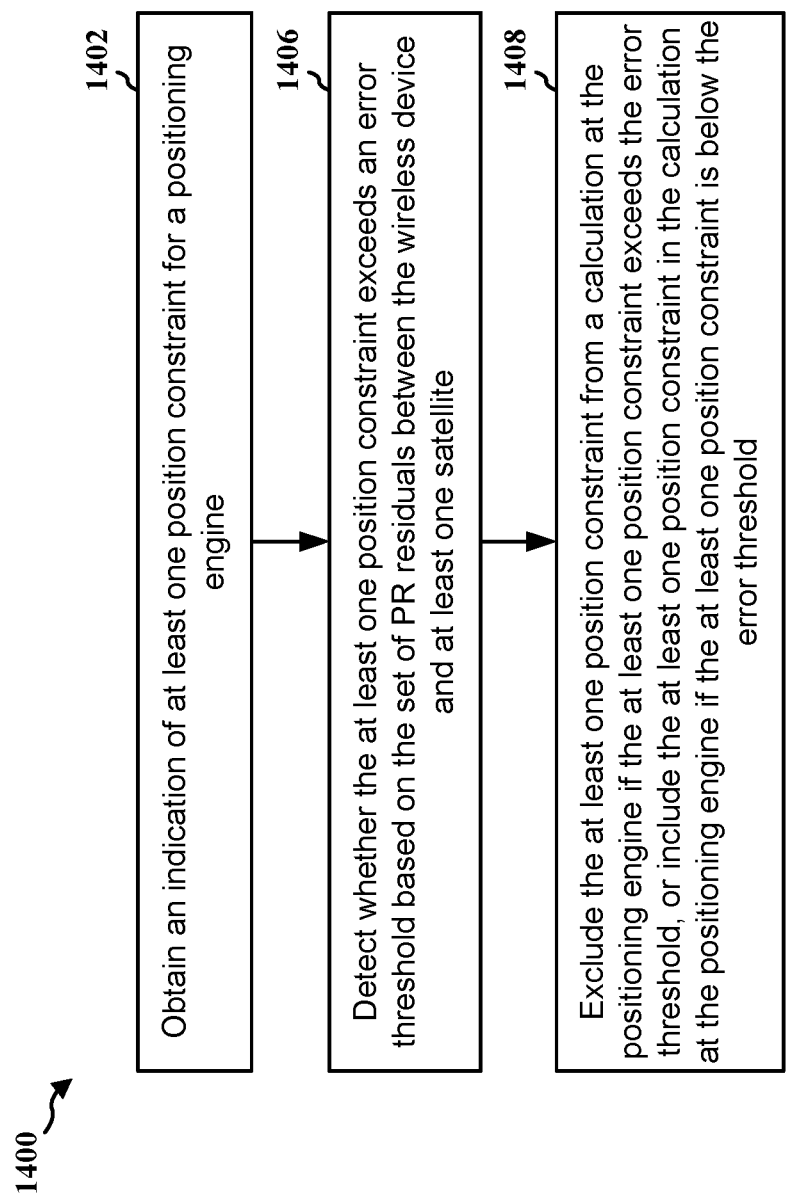
FIG. 14 is a flowchart of a method of wireless communication.

FIG. 14 is a flowchart 1400 of a method of wireless communication. The method may be performed by a wireless device (e.g., the base station 102; the LMF 166; the UE 104, 404; the GNSS device 506; the rover device 604; the PPE 1002; the apparatus 1504). The method may enable the wireless device (e.g., a positioning engine) to detect whether a position constraint is associated with an error and to recover to a regular positioning engine performance if it detects that the position constraint is associated with an error.

At 1402, the wireless device may obtain an indication of at least one position constraint for a positioning engine, such as described in connection with FIG. 10. For example, at 1022, the PPE 1002 may obtain position constraint information via its position constraint module 1006. The means for obtaining the indication of at least one position constraint may be performed by, e.g., the positioning engine component 198, the cellular baseband processor 1524, and/or the transceiver(s) 1522 of the apparatus 1504 in FIG. 15.

In one example, the at least one position constraint includes at least one of: a DR output from a fusion engine, a camera vision output from at least one camera, a user manual input, an odometer output, a map-matching output, an UWB positioning output, a terrestrial positioning output, a Wi-Fi positioning output, or a network-based positioning output.

In another example, the wireless device is a UE, a base station, a network node, a network entity, a location server, the positioning engine, or an IoT device.

In another example, the positioning engine is a PPP engine or an RTK engine.

In another example, the indication of the at least one position constraint for the positioning engine is obtained after a GNSS outage.

In another example, to obtain the indication of the at least one position constraint, the wireless device may receive the indication of the at least one position constraint from the positioning engine.

In another example, the wireless device may calculate a set of PR residuals between the wireless device and the at least one satellite via the positioning engine, such as described in connection with FIG. 10. For example, the PPE 1002 may calculate a set of PR residuals using a position constraint. The means for calculating the set of PR residuals may be performed by, e.g., the positioning engine component 198, the cellular baseband processor 1524, and/or the transceiver(s) 1522 of the apparatus 1504 in FIG. 15.

In another example, the set of PR residuals includes at least one of: a receiver clock error, a position constraint error, or an atmospheric error.

At 1406, the wireless device may detect whether the at least one position constraint exceeds an error threshold based on the set of PR residuals between the wireless device and at least one satellite, such as described in connection with FIG. 10. For example, as the PR residuals may be very large when the position constraint is associated with a large error, the PPE 1002 may detect whether the at least one position constraint is associated with an error (e.g., a large error) based on the PR residuals. The means for detecting whether the at least one position constraint exceeds an error threshold may be performed by, e.g., the positioning engine component 198, the cellular baseband processor 1524, and/or the transceiver(s) 1522 of the apparatus 1504 in FIG. 15.

In one example, the error threshold is a maximum error threshold (e.g., the large error threshold).

At 1408, the wireless device may exclude the at least one position constraint from a calculation at the positioning engine if the at least one position constraint exceeds the error threshold, or include the at least one position constraint in the calculation at the positioning engine if the at least one position constraint is below the error threshold, such as described in connection with FIG. 10. For example, if the PPE 1002 determines that the position constraint includes an error based on the calculated PR residuals, the PPE 1002 may exclude the position constraint from a calculation (e.g., a positioning calculation) at the PPE 1002. On the other hand, as shown at 1036, the aggregator module 1018 of the PPE 1002 may include the position constraint in the calculation if the position constraint does not exceed the error threshold. The means for excluding or including the at least one position constraint may be performed by, e.g., the positioning engine component 198, the cellular baseband processor 1524, and/or the transceiver(s) 1522 of the apparatus 1504 in FIG. 15.

In one example, to include the at least one position constraint in the calculation at the positioning engine, the wireless device may recover the at least one position constraint if the at least one position constraint is below the error threshold. In such an example, the wireless device may calculate a difference between a first position of the wireless device that is calculated based on the positioning engine without the at least one position constraint and a second position of the wireless device that is calculated based on the positioning engine with the at least one position constraint, and the wireless device may exclude the at least one position constraint from the calculation at the positioning engine in response to the difference exceeding a difference threshold, or include the at least one position constraint in the calculation at the positioning engine in response to the difference not exceeding the difference threshold. In such an example, the first position of the wireless device and the second position of the wireless device are calculated for a same epoch. In another example, to recover the at least one position constraint if the at least one position constraint is below the error threshold, the wireless device may exclude the at least one position constraint from the calculation at the positioning engine if the positioning engine is converged without the at least one position constraint.

In another example, to include the at least one position constraint in the calculation at the positioning engine if the at least one position constraint is below the error threshold, the wireless device may compute a first delta position of the wireless device using a DCP, the wireless device may calculate a difference between a first position of the wireless device that is calculated based on the first delta position with a second position of the wireless device that is calculated based on a second delta position derived from the at least one position constraint, and the wireless device may exclude the at least one position constraint from the calculation at the positioning engine in response to the difference exceeding a difference threshold, or include the at least one position constraint in the calculation at the positioning engine in response to the difference not exceeding the difference threshold. In such an example, the first position of the wireless device and the second position of the wireless device are calculated for a same epoch.

In another example, the wireless device may initiate the calculation at the positioning engine after excluding the at least one position constraint from the calculation or including the at least one position constraint in the calculation, such as described in connection with FIG. 10. For example, at 1036, the aggregator module 1018 of the PPE 1002 may generate an aggregated PPE solution, and the PPE 1002 may perform positioning based on this aggregated PPE solution. The means for initiating the calculation at the positioning engine may be performed by, e.g., the positioning engine component 198, the cellular baseband processor 1524, and/or the transceiver(s) 1522 of the apparatus 1504 in FIG. 15.

Figure 15:
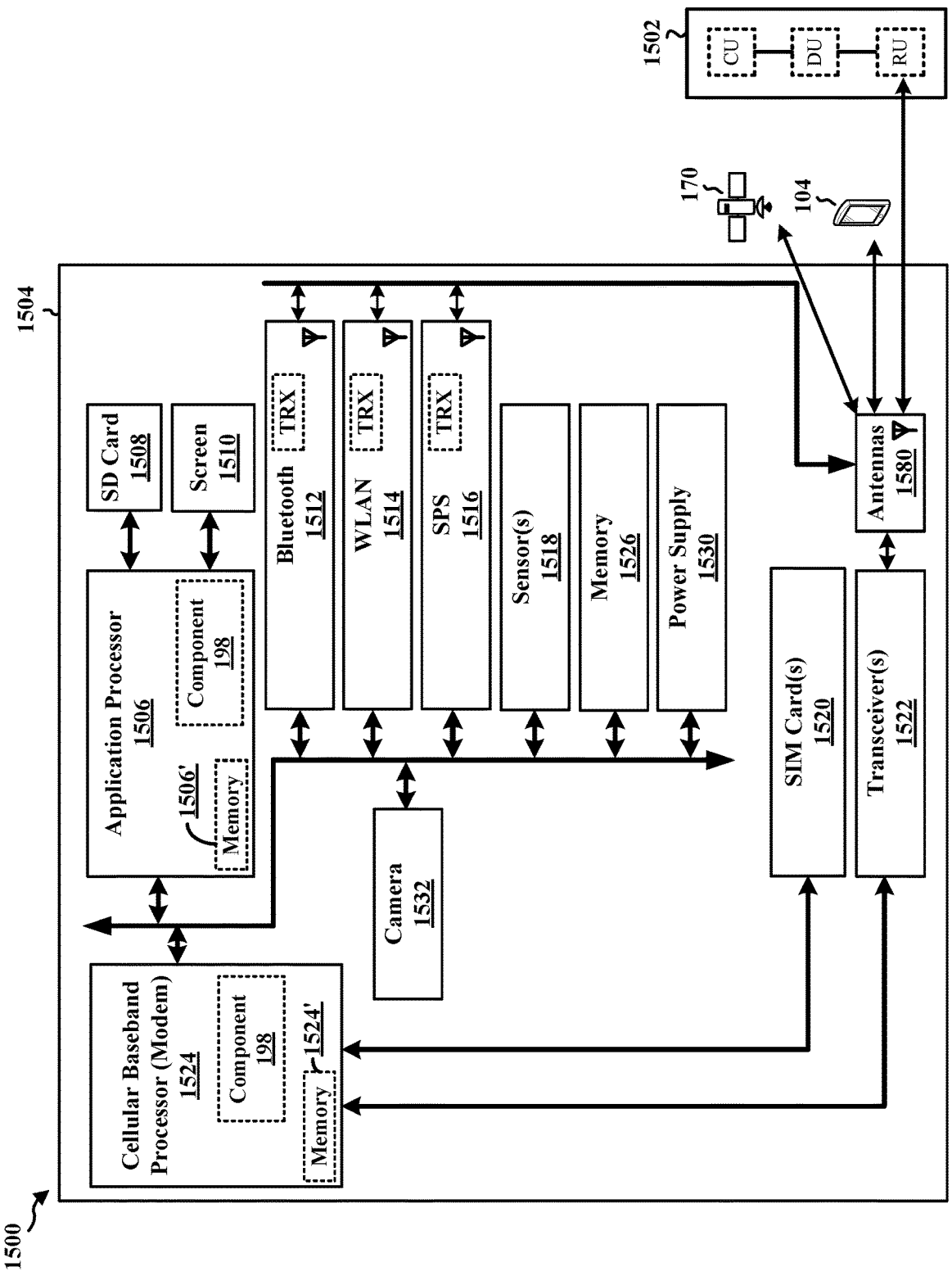
FIG. 15 is a diagram illustrating an example of a hardware implementation for an apparatus or a network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., sec 350 of FIG. 3) and include the additional modules of the apparatus 1504.

As discussed supra, the positioning engine component 198 is configured to obtain an indication of at least one position constraint for a positioning engine. The positioning engine component 198 may also be configured to detect whether the at least one position constraint exceeds an error threshold based on a set of PR residuals between the wireless device and at least one satellite. The positioning engine component 198 may also be configured to exclude the at least one position constraint from a calculation at the positioning engine if the at least one position constraint exceeds the error threshold, or include the at least one position constraint in the calculation at the positioning engine if the at least one position constraint is below the error threshold. The positioning engine component 198 may be within the cellular baseband processor 1524, the application processor 1506, or both the cellular baseband processor 1524 and the application processor 1506. The positioning engine component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for obtaining an indication of at least one position constraint for a positioning engine. The apparatus 1504 may further include means for detecting whether the at least one position constraint exceeds an error threshold based on a set of PR residuals between the wireless device and at least one satellite. The apparatus 1504 may further include means for excluding the at least one position constraint from a calculation at the positioning engine if the at least one position constraint exceeds the error threshold, or means for including the at least one position constraint in the calculation at the positioning engine if the at least one position constraint is below the error threshold. In one configuration, the at least one position constraint includes at least one of: a DR output from a fusion engine, a camera vision output from at least one camera, a user manual input, an odometer output, a map-matching output, an UWB positioning output, a terrestrial positioning output, a Wi-Fi positioning output, or a network-based positioning output.

In another configuration, the wireless device is a UE, a base station, a network node, a network entity, a location server, the positioning engine, or an IoT device.

In another configuration, the positioning engine is a PPP engine or an RTK engine.

In another configuration, the indication of the at least one position constraint for the positioning engine is obtained after a GNSS outage.

In another configuration, to obtain the indication of the at least one position constraint, the wireless device may receive the indication of the at least one position constraint from the positioning engine.

In another configuration, the apparatus 1504 may further include means for calculating a set of PR residuals between the wireless device and the at least one satellite via the positioning engine.

In another configuration, the set of PR residuals includes at least one of: a receiver clock error, a position constraint error, or an atmospheric error.

In another configuration, the error threshold is a maximum error threshold (e.g., the large error threshold).

In one configuration, the means for including the at least one position constraint in the calculation at the positioning engine includes configuring the apparatus 1504 to recover the at least one position constraint if the at least one position constraint is below the error threshold. In such a configuration, the apparatus 1504 may further include means for calculating a difference between a first position of the wireless device that is calculated based on the positioning engine without the at least one position constraint and a second position of the wireless device that is calculated based on the positioning engine with the at least one position constraint, and means for excluding the at least one position constraint from the calculation at the positioning engine in response to the difference exceeding a difference threshold, or means for including the at least one position constraint in the calculation at the positioning engine in response to the difference not exceeding the difference threshold. In such a configuration, the first position of the wireless device and the second position of the wireless device are calculated for a same epoch. In another configuration, to recover the at least one position constraint if the at least one position constraint is below the error threshold, the apparatus 1504 may further include means for excluding the at least one position constraint from the calculation at the positioning engine if the positioning engine is converged without the at least one position constraint.

In another configuration, the means for including the at least one position constraint in the calculation at the positioning engine if the at least one position constraint is below the error threshold includes configuring the apparatus 1504 to compute a first delta position of the wireless device using a DCP, to calculate a difference between a first position of the wireless device that is calculated based on the first delta position with a second position of the wireless device that is calculated based on a second delta position derived from the at least one position constraint, and to exclude the at least one position constraint from the calculation at the positioning engine in response to the difference exceeding a difference threshold, or include the at least one position constraint in the calculation at the positioning engine in response to the difference not exceeding the difference threshold. In such a configuration, the first position of the wireless device and the second position of the wireless device are calculated for a same epoch.

In another configuration, the apparatus 1504 may further include means for initiating the calculation at the positioning engine after excluding the at least one position constraint from the calculation or including the at least one position constraint in the calculation.

The means may be the positioning engine component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: obtaining an indication of at least one position constraint for a positioning engine; detecting whether the at least one position constraint exceeds an error threshold based on a set of PR residuals between the wireless device and at least one satellite; and excluding the at least one position constraint from a calculation at the positioning engine if the at least one position constraint exceeds the error threshold, or including the at least one position constraint in the calculation at the positioning engine if the at least one position constraint is below the error threshold.

Aspect 2 is the method of aspect 1, where the at least one position constraint includes at least one of: a DR output from a fusion engine, a camera vision output from at least one camera, a user manual input, an odometer output, a map-matching output, an UWB positioning output, a terrestrial positioning output, a Wi-Fi positioning output, or a network-based positioning output.

Aspect 3 is the method of aspect 1 or 2, further including: calculating the set of PR residuals between the wireless device and the at least one satellite via the positioning engine.

Aspect 4 is the method of aspect 3, where the set of PR residuals includes at least one of: a receiver clock error, a position constraint error, or an atmospheric error.

Aspect 5 is the method of any of aspects 1 to 4, further including: initiating the calculation at the positioning engine after excluding the at least one position constraint from the calculation or including the at least one position constraint in the calculation.

Aspect 6 is the method any of aspects 1 to 5, where including the at least one position constraint in the calculation at the positioning engine includes: recovering the at least one position constraint if the at least one position constraint is below the error threshold.

Aspect 7 is the method of aspect 6, where recovering the at least one position constraint if the at least one position constraint is below the error threshold includes: calculating a difference between a first position of the wireless device that is calculated based on the positioning engine without the at least one position constraint and a second position of the wireless device that is calculated based on the positioning engine with the at least one position constraint; and excluding the at least one position constraint from the calculation at the positioning engine in response to the difference exceeding a difference threshold, or including the at least one position constraint in the calculation at the positioning engine in response to the difference not exceeding the difference threshold.

Aspect 8 is the method of aspect 7, where the first position of the wireless device and the second position of the wireless device are calculated for a same epoch.

Aspect 9 is the method of aspect 6, where recovering the at least one position constraint if the at least one position constraint is below the error threshold includes: excluding the at least one position constraint from the calculation at the positioning engine if the positioning engine is converged without the at least one position constraint.

Aspect 10 is the method of any of aspects 1 to 9, where including the at least one position constraint in the calculation at the positioning engine if the at least one position constraint is below the error threshold includes: computing a first delta position of the wireless device using a DCP; calculating a difference between a first position of the wireless device that is calculated based on the first delta position with a second position of the wireless device that is calculated based on a second delta position derived from the at least one position constraint; and excluding the at least one position constraint from the calculation at the positioning engine in response to the difference exceeding a difference threshold, or including the at least one position constraint in the calculation at the positioning engine in response to the difference not exceeding the difference threshold.

Aspect 11 is the method of aspect 10, where the first position of the wireless device and the second position of the wireless device are calculated for a same epoch.

Aspect 12 is the method of any of aspects 1 to 11, where the wireless device is a UE, a base station, a network node, a network entity, a location server, the positioning engine, or an IoT device.

Aspect 13 is the method of any of aspects 1 to 12, where the positioning engine is a PPP engine or an RTK engine.

Aspect 14 is the method of any of aspects 1 to 13, where the error threshold is a maximum error threshold.

Aspect 15 is the method of any of aspects 1 to 14, where the indication of the at least one position constraint for the positioning engine is obtained after a GNSS outage.

Aspect 16 is the method of any of aspects 1 to 15, where obtaining the indication of the at least one position constraint includes: receiving the indication of the at least one position constraint from the positioning engine.

Aspect 17 is an apparatus for wireless communication at a wireless device, including: a memory; and at least one processor coupled to the memory and, based at least in part on information stored in the memory, the at least one processor is configured to implement any of aspects 1 to 16.

Aspect 18 is the apparatus of aspect 17, further including at least one of a transceiver or an antenna coupled to the at least one processor.

Aspect 19 is an apparatus for wireless communication including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

What is claimed is:

1. An apparatus for wireless communication at a wireless device, comprising:
   a memory; and
   at least one processor coupled to the memory, the at least one processor is configured to:
   obtain an indication of at least one position constraint for a positioning engine;
   detect whether the at least one position constraint exceeds an error threshold based on a set of pseudo-range (PR) residuals between the wireless device and at least one satellite; and
   exclude the at least one position constraint from a calculation at the positioning engine if the at least one position constraint exceeds the error threshold, or include the at least one position constraint in the calculation at the positioning engine if the at least one position constraint is below the error threshold.

2. The apparatus of claim 1, wherein the at least one position constraint includes at least one of:
   a dead-reckoning (DR) output from a fusion engine,
   a camera vision output from at least one camera,
   a user manual input,
   an odometer output,
   a map-matching output,
   an ultra-wideband (UWB) positioning output,
   a terrestrial positioning output,
   a Wi-Fi positioning output, or
   a network-based positioning output.

3. The apparatus of claim 1, wherein the at least one processor is further configured to:
   calculate the set of PR residuals between the wireless device and the at least one satellite via the positioning engine.

4. The apparatus of claim 3, wherein the set of PR residuals includes at least one of: a receiver clock error, a position constraint error, or an atmospheric error.

5. The apparatus of claim 1, wherein the at least one processor is further configured to:
   initiate the calculation at the positioning engine after the at least one processor is configured to exclude the at least one position constraint from the calculation or include the at least one position constraint in the calculation.

6. The apparatus of claim 1, wherein to include the at least one position constraint in the calculation at the positioning engine, the at least one processor is configured to: recover the at least one position constraint if the at least one position constraint is below the error threshold.

7. The apparatus of claim 6, wherein to recover the at least one position constraint if the at least one position constraint is below the error threshold, the at least one processor is configured to:
   calculate a difference between a first position of the wireless device that is calculated based on the positioning engine without the at least one position constraint and a second position of the wireless device that is calculated based on the positioning engine with the at least one position constraint; and
   exclude the at least one position constraint from the calculation at the positioning engine in response to the difference exceeding a difference threshold, or include the at least one position constraint in the calculation at the positioning engine in response to the difference not exceeding the difference threshold.

8. The apparatus of claim 7, wherein the first position of the wireless device and the second position of the wireless device are configured to be calculated for a same epoch.

9. The apparatus of claim 6, wherein to recover the at least one position constraint if the at least one position constraint is below the error threshold, the at least one processor is configured to:
   exclude the at least one position constraint from the calculation at the positioning engine if the positioning engine is converged without the at least one position constraint.

10. The apparatus of claim 1, wherein to include the at least one position constraint in the calculation at the positioning engine if the at least one position constraint is below the error threshold, the at least one processor is configured to:
    compute a first delta position of the wireless device using a delta carrier phase (DCP);
    calculate a difference between a first position of the wireless device that is calculated based on the first delta position with a second position of the wireless device that is calculated based on a second delta position derived from the at least one position constraint; and
    exclude the at least one position constraint from the calculation at the positioning engine in response to the difference exceeding a difference threshold, or include the at least one position constraint in the calculation at the positioning engine in response to the difference not exceeding the difference threshold.

11. The apparatus of claim 10, wherein the first position of the wireless device and the second position of the wireless device are configured to be calculated for a same epoch.

12. The apparatus of claim 1, wherein the wireless device is a user equipment (UE), a base station, a network node, a network entity, a location server, the positioning engine, or an Internet of Things (IoT) device.

13. The apparatus of claim 1, wherein the positioning engine is a precise point positioning (PPP) engine or a real-time kinematic (RTK) engine.

14. The apparatus of claim 1, wherein the error threshold is a maximum error threshold.

15. The apparatus of claim 1, wherein the at least one processor is configured to obtain the indication of the at least one position constraint for the positioning engine after a global navigation satellite system (GNSS) outage.

16. The apparatus of claim 1, further comprising at least one of a transceiver or an antenna coupled to the at least one processor, wherein to obtain the indication of the at least one position constraint, the at least one processor is configured to: receive, via at least one of the transceiver or the antenna, the indication of the at least one position constraint from the positioning engine.

17. A method of wireless communication at a wireless device, comprising:
    obtaining an indication of at least one position constraint for a positioning engine;
    detecting whether the at least one position constraint exceeds an error threshold based on a set of pseudo-range (PR) residuals between the wireless device and at least one satellite; and
    excluding the at least one position constraint from a calculation at the positioning engine if the at least one position constraint exceeds the error threshold, or including the at least one position constraint in the calculation at the positioning engine if the at least one position constraint is below the error threshold.

18. The method of claim 17, wherein the at least one position constraint includes at least one of:
   a dead-reckoning (DR) output from a fusion engine,
   a camera vision output from at least one camera,
   a user manual input,
   an odometer output,
   a map-matching output,
   an ultra-wideband (UWB) positioning output,
   a terrestrial positioning output,
   a Wi-Fi positioning output, or
   a network-based positioning output.

19. The method of claim 17, further comprising:
   calculating the set of PR residuals between the wireless device and the at least one satellite via the positioning engine.

20. The method of claim 19, wherein the set of PR residuals includes at least one of: a receiver clock error, a position constraint error, or an atmospheric error.

21. The method of claim 17, further comprising:
   initiating the calculation at the positioning engine after excluding the at least one position constraint from the calculation or including the at least one position constraint in the calculation.

22. The method of claim 17, wherein including the at least one position constraint in the calculation at the positioning engine comprises: recovering the at least one position constraint if the at least one position constraint is below the error threshold.

23. The method of claim 22, wherein recovering the at least one position constraint if the at least one position constraint is below the error threshold comprises:
   calculating a difference between a first position of the wireless device that is calculated based on the positioning engine without the at least one position constraint and a second position of the wireless device that is calculated based on the positioning engine with the at least one position constraint; and
   excluding the at least one position constraint from the calculation at the positioning engine in response to the difference exceeding a difference threshold, or including the at least one position constraint in the calculation at the positioning engine in response to the difference not exceeding the difference threshold.

24. The method of claim 23, wherein the first position of the wireless device and the second position of the wireless device are calculated for a same epoch.

25. The method of claim 22, wherein recovering the at least one position constraint if the at least one position constraint is below the error threshold comprises:
   excluding the at least one position constraint from the calculation at the positioning engine if the positioning engine is converged without the at least one position constraint.

26. The method of claim 17, wherein including the at least one position constraint in the calculation at the positioning engine if the at least one position constraint is below the error threshold comprises:
   computing a first delta position of the wireless device using a delta carrier phase (DCP);
   calculating a difference between a first position of the wireless device that is calculated based on the first delta position with a second position of the wireless device that is calculated based on a second delta position derived from the at least one position constraint; and
   excluding the at least one position constraint from the calculation at the positioning engine in response to the difference exceeding a difference threshold, or including the at least one position constraint in the calculation at the positioning engine in response to the difference not exceeding the difference threshold.

27. The method of claim 26, wherein the first position of the wireless device and the second position of the wireless device are calculated for a same epoch.

28. The method of claim 17, wherein obtaining the indication of the at least one position constraint comprises: receiving the indication of the at least one position constraint from the positioning engine.

29. An apparatus for wireless communication at a wireless device, comprising:
   means for obtaining an indication of at least one position constraint for a positioning engine;
   means for detecting whether the at least one position constraint exceeds an error threshold based on a set of pseudo-range (PR) residuals between the wireless device and at least one satellite; and
   means for excluding the at least one position constraint from a calculation at the positioning engine if the at least one position constraint exceeds the error threshold, or including the at least one position constraint in the calculation at the positioning engine if the at least one position constraint is below the error threshold.

30. A non-transitory computer-readable medium storing computer executable code at a wireless device, the code when executed by a processor causes the processor to:
   obtain an indication of at least one position constraint for a positioning engine;
   detect whether the at least one position constraint exceeds an error threshold based on a set of pseudo-range (PR) residuals between the wireless device and at least one satellite; and
   exclude the at least one position constraint from a calculation at the positioning engine if the at least one position constraint exceeds the error threshold, or include the at least one position constraint in the calculation at the positioning engine if the at least one position constraint is below the error threshold.

* * * * *